United States Patent
Hara

(10) Patent No.: US 9,727,773 B2
(45) Date of Patent: Aug. 8, 2017

(54) FINGERPRINT CORE EXTRACTION DEVICE FOR FINGERPRINT MATCHING, FINGERPRINT MATCHING SYSTEM, FINGERPRINT CORE EXTRACTION METHOD, AND PROGRAM THEREFOR

(71) Applicant: NEC Corporation, Minato-ku, Tokyo (JP)

(72) Inventor: Masanori Hara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/911,900

(22) PCT Filed: Aug. 21, 2014

(86) PCT No.: PCT/JP2014/071933
§ 371 (c)(1),
(2) Date: Feb. 12, 2016

(87) PCT Pub. No.: WO2015/025933
PCT Pub. Date: Feb. 26, 2015

(65) Prior Publication Data
US 2016/0196461 A1 Jul. 7, 2016

(30) Foreign Application Priority Data
Aug. 21, 2013 (JP) .................................. 2013-170924

(51) Int. Cl.
*G06K 9/00* (2006.01)
(52) U.S. Cl.
CPC ........... *G06K 9/0008* (2013.01); *G06K 9/001* (2013.01); *G06K 9/00073* (2013.01); *G06K 9/00093* (2013.01)

(58) Field of Classification Search
CPC ........... G06K 9/00067; G06K 9/00087; G06K 9/0008; G06K 9/00073; G06K 9/00093; G06K 9/001
See application file for complete search history.

(56) References Cited

U.S. PATENT DOCUMENTS

| 5,960,101 A * | 9/1999 | Lo | ...................... G06K 9/00087 382/124 |
| 2002/0018585 A1 * | 2/2002 | Kim | ................... G06K 9/00067 382/125 |

(Continued)

FOREIGN PATENT DOCUMENTS

| JP | 10-177650 A | 6/1998 |
| JP | 2000-020693 A | 1/2000 |

(Continued)

OTHER PUBLICATIONS

International Search Report for PCT Application No. PCT/JP2014/071933, mailed on Oct. 14, 2014.

(Continued)

*Primary Examiner* — Ali Bayat

(57) ABSTRACT

To extract a fingerprint core for alignment of a fingerprint image for fingerprint matching. The present invention comprises: a core extraction unit which has an endpoint processing function of generating an endpoint image by extracting bifurcations in skeleton image and subjecting the respective bifurcations to endpoint processing; and a skeleton image generation/extraction unit which extracts skeletons of a density-inverted image formed by inverting the density colors of the generated end point image from white to black and vice versa, and performs processing for generating the skeleton image, the core extraction unit being provided with a core determination function of specifying a skeleton pixel having the highest value of a loop score indicating the degree of a bend in a skeleton shape in the (Continued)

density-inverted image, and defining this skeleton pixel as the finger print core.

10 Claims, 22 Drawing Sheets

(56) References Cited

U.S. PATENT DOCUMENTS

| | | |
|---|---|---|
| 2002/0150283 A1 | 10/2002 | Mimura et al. |
| 2004/0101173 A1 | 5/2004 | Hara et al. |
| 2007/0230754 A1* | 10/2007 | Jain .................... G06K 9/00093 382/125 |
| 2012/0020535 A1* | 1/2012 | Liachenko ......... G06K 9/00073 382/125 |
| 2013/0101186 A1* | 4/2013 | Walch ................ G06K 9/00093 382/125 |
| 2014/0241598 A1* | 8/2014 | Fedele ............... G06K 9/00046 382/125 |
| 2015/0227818 A1* | 8/2015 | Neumann .......... G06K 9/00073 382/197 |
| 2015/0286855 A1* | 10/2015 | Neskovic ........... G06K 9/00073 382/125 |
| 2016/0104027 A1* | 4/2016 | Neumann .......... G06K 9/00073 382/125 |
| 2016/0321496 A1* | 11/2016 | Mather .............. G06K 9/00013 |

FOREIGN PATENT DOCUMENTS

| | | |
|---|---|---|
| JP | 2001-344213 A | 12/2001 |
| JP | 2004-078434 A | 3/2004 |

OTHER PUBLICATIONS

D. Maltoni et al., Handbook of Fingerprint Recognition, pp. 83-113, pp. 141-155, Springer 2003.

A. K. Jain et al., Pores and Ridges: Fingerprint Matching Using Level3 Features, pp. 15-27, IEE Transactions on Pattern Analysis and Machine Intelligence, vol. 29, No. 1, Jan. 2007.

Federal Bureau of Investigation, The Science of Fingerprints—Classification and Uses, Aug. 2006, pp. 5-23.

* cited by examiner

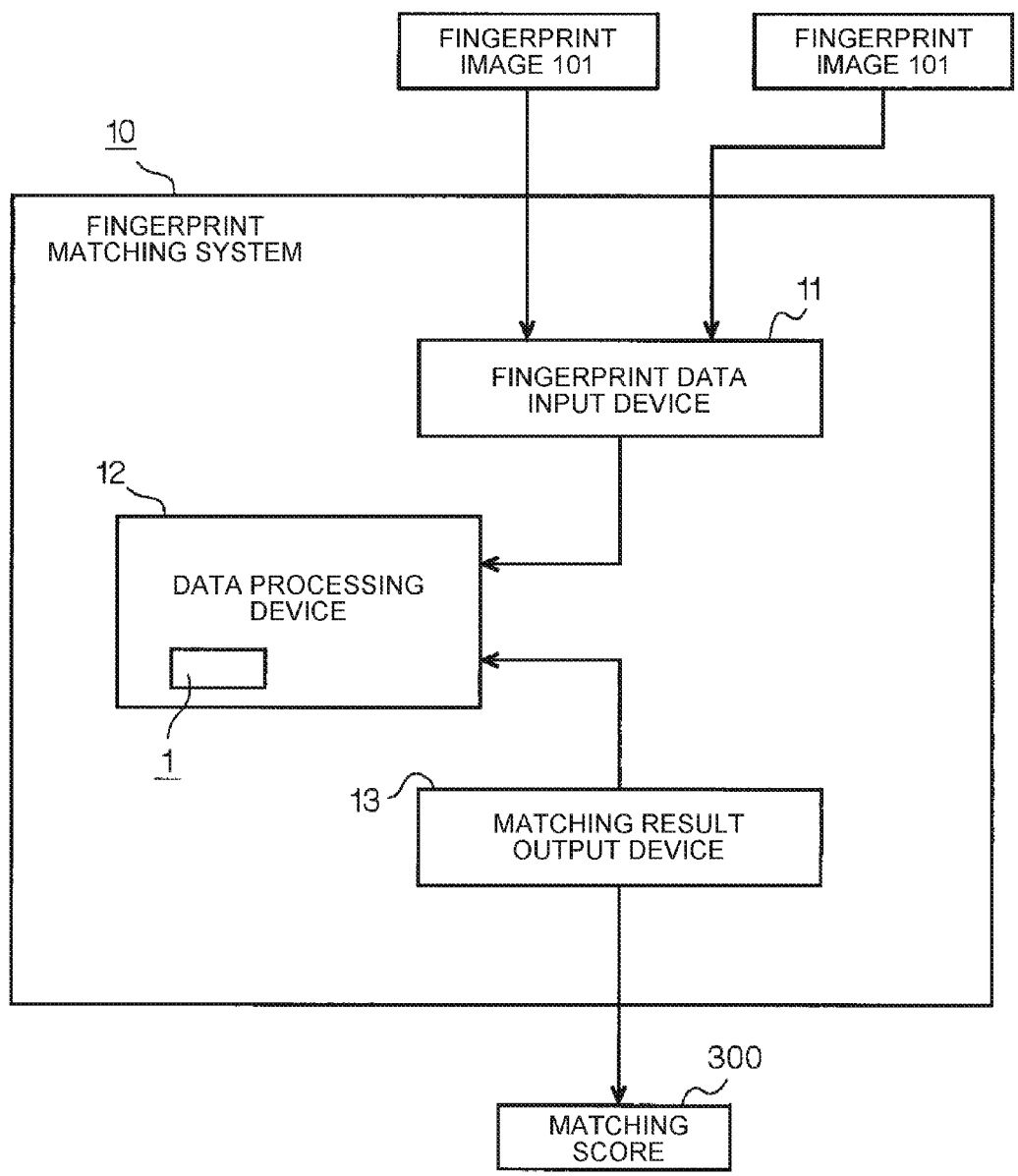

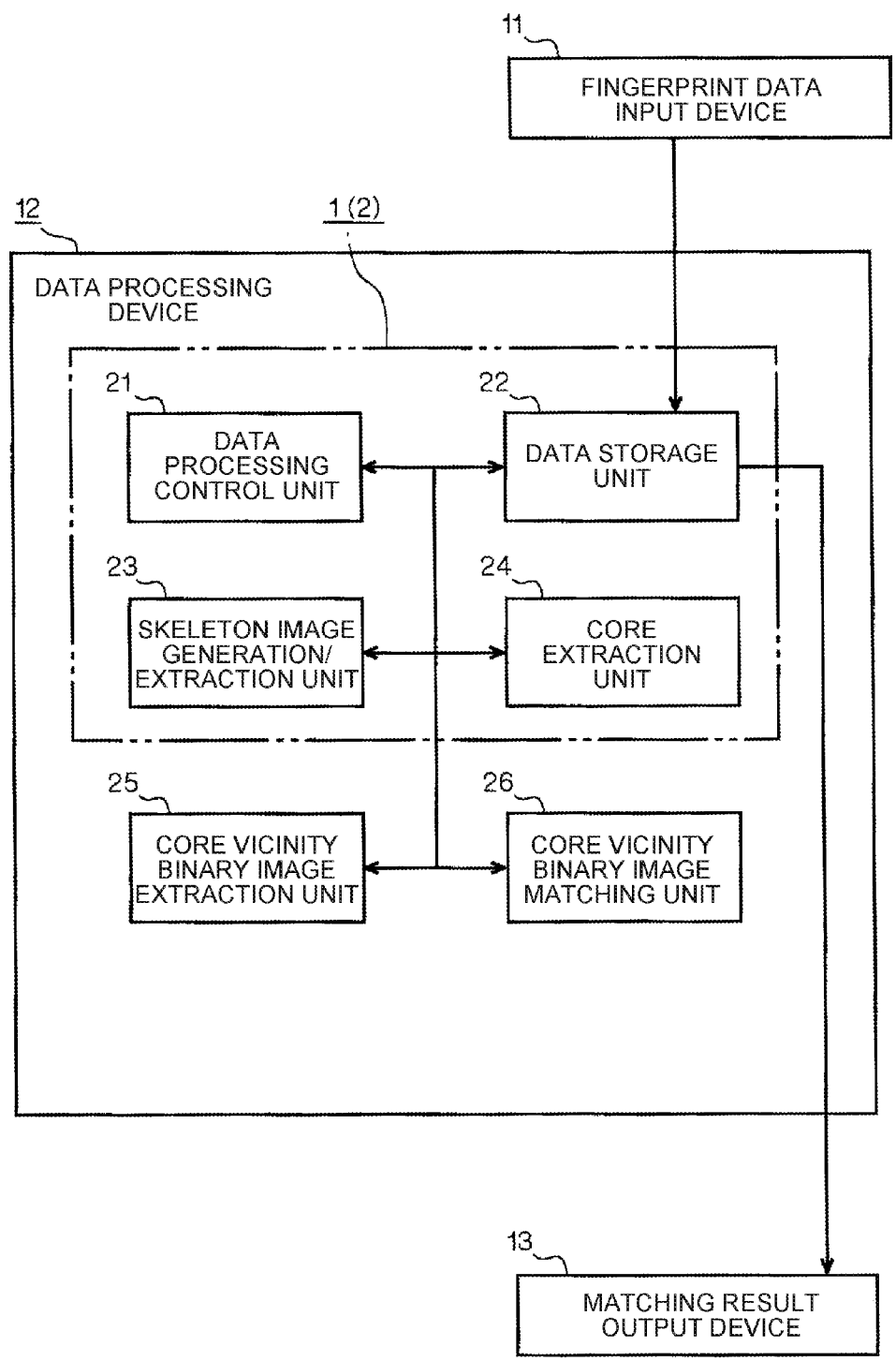

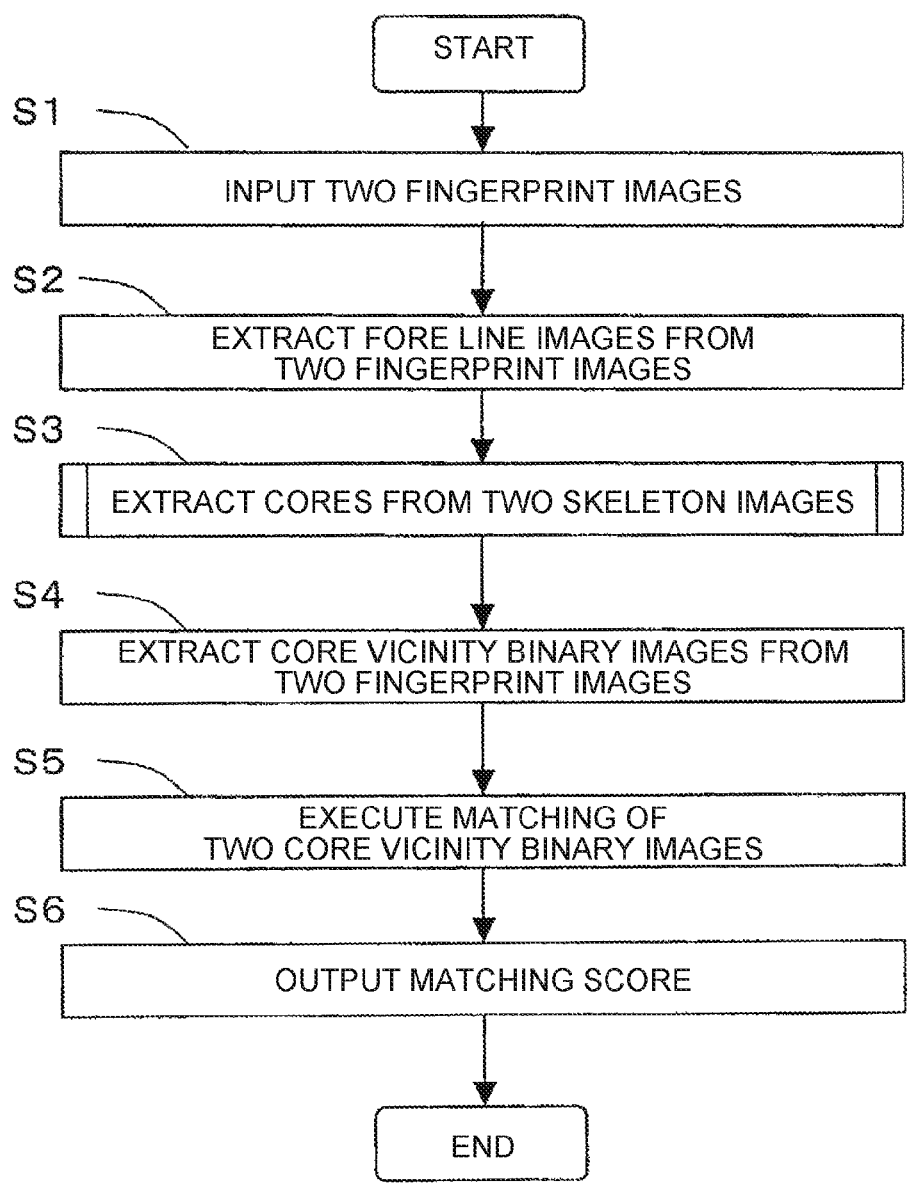

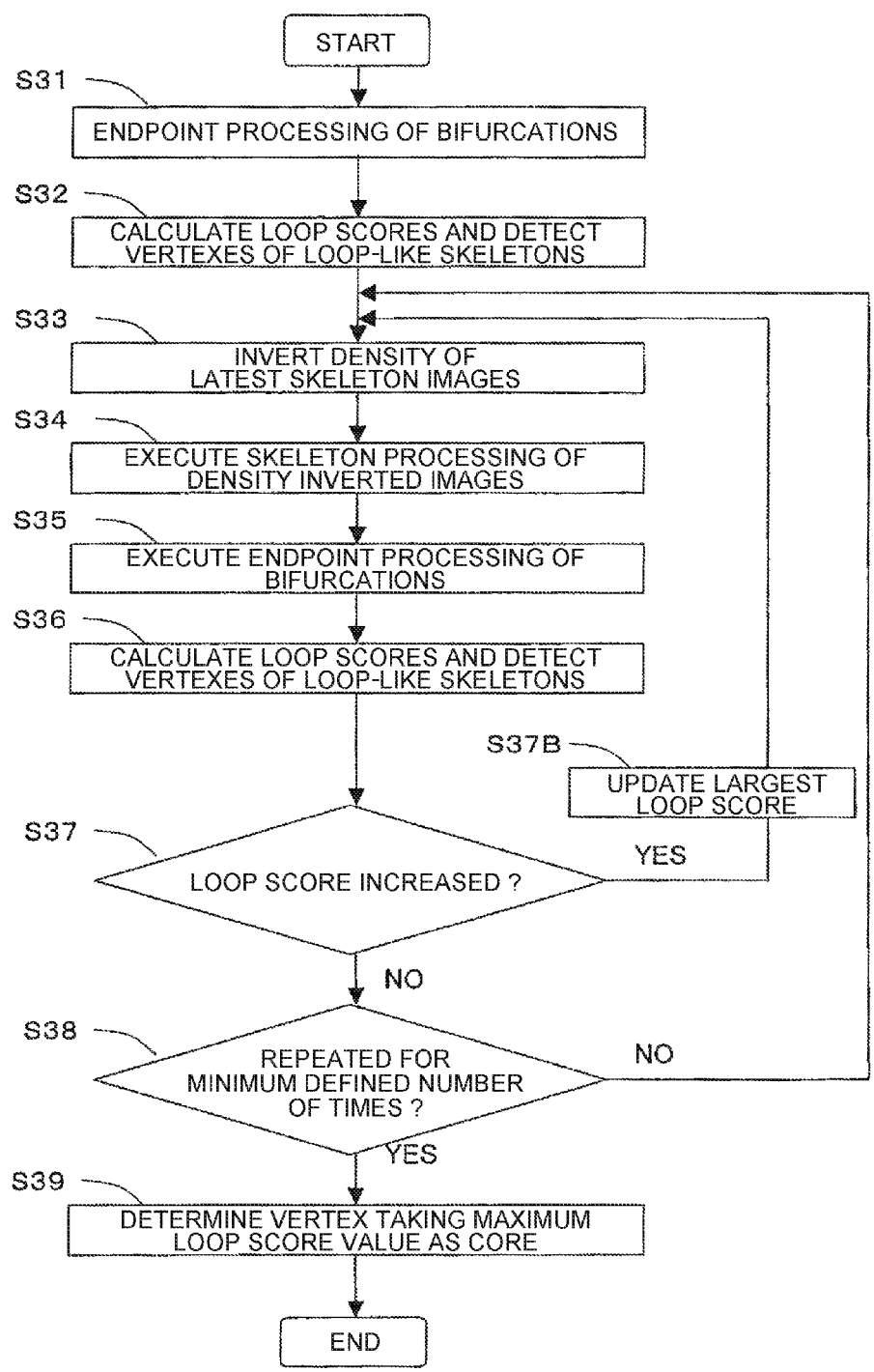

FINGERPRINT IMAGE 101

FINGERPRINT IMAGE 102

MINUTIAE OF
FINGERPRINT IMAGE 101

MINUTIAE OF
FINGERPRINT IMAGE 102

SKELETON IMAGE OF FINGERPRINT IMAGE 101

SKELETON IMAGE OF FINGERPRINT IMAGE 102

EXAMPLE OF BIFURCATION SKELETON IMAGE

INTERIOR ANGLE COMPARISON A

INTERIOR ANGLE COMPARISON

SKELETON IMAGE AFTER EXECUTING ENDPOINT PROCESSING OF BIFURCATION

ENDPOINT-PROCESSED SKELETON IMAGE OF FINGERPRINT IMAGE 102

ENDPOINT-PROCESSED SKELETON IMAGE OF FINGERPRINT IMAGE 101

INNERMOST LOOP CANDIDATE OF FINGERPRINT IMAGE 101

INNERMOST LOOP CANDIDATE OF FINGERPRINT IMAGE 102

CORE DIRECTION OF FINGERPRINT IMAGE 101

CORE DIRECTION OF FINGERPRINT IMAGE 102

DENSITY INVERTED SKELETON IMAGE OF FINGERPRINT IMAGE 102

DENSITY INVERTED SKELETON IMAGE OF FINGERPRINT IMAGE 101

ENDPOINT-PROCESSED SKELETON IMAGE
BASED ON FIG. 11B OF SKELETON IMAGE 102

ENDPOINT-PROCESSED SKELETON IMAGE
BASED ON FIG. 11A OF SKELETON IMAGE 101

INNERMOST LOOP CANDIDATE $1022_2$
BASED ON FIG.12B OF SKELETON IMAGE 102

INNERMOST LOOP CANDIDATE $1011_2$
BASED ON FIG.12A OF SKELETON IMAGE 101

ENDPOINT-PROCESSED SKELETON OF SECOND-TIME DENSITY INVERTED IMAGE OF FINGERPRINT IMAGE 102

ENDPOINT-PROCESSED SKELETON IMAGE OF SECOND-TIME DENSITY INVERTED IMAGE OF FINGERPRINT IMAGE 101

INNERMOST LOOP CANDIDATE $102_3$
BASED ON FIG. 14B OF SKELETON IMAGE 102

INNERMOST LOOP CANDIDATE $101_3$
BASED ON FIG. 14A OF SKELETON IMAGE 101

CORE POSITION OF FINGERPRINT IMAGE 102

CORE POSITION OF FINGERPRINT IMAGE 101

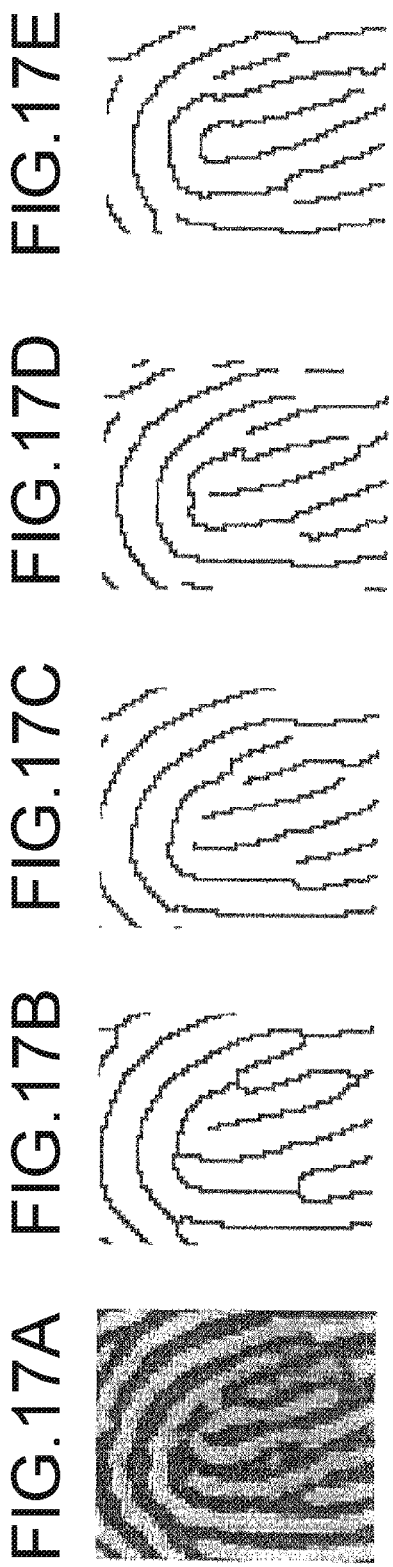

CORE VICINITY BINARY IMAGE OF
FINGERPRINT IMAGE 102

CORE VICINITY BINARY IMAGE OF
FINGERPRINT IMAGE 101

[CORE VICINITY SKELETON IMAGE 103
BASED ON FIG.18A OF FINGERPRINT IMAGE 101]

[ EXAMPLES OF LATENT FINGERPRINT AND INKED FINGERPRINT IMAGES ]
FIG. 20A
LATENT FINGERPRINT IMAGE
FIG. 20B
INKED FINGERPRINT IMAGE
FIG. 20C
ENLARGED IMAGE IN VICINITY OF CORE OF LATENT FINGERPRINT
FIG. 20D
ENLARGED IMAGE IN VICINITY OF CORE OF INKED FINGERPRINT
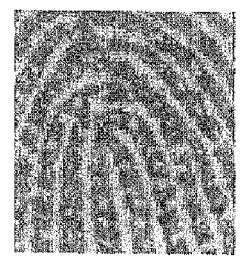

[MANUALLY INPUTTED SKELETON IMAGES OF LATENT FINGERPRINT]

SKELETON IMAGE

SUPERIMPOSED SKELETON IMAGE

CORE VICINITY BINARY IMAGE OF INKED FINGERPRINT

[SKELETON IMAGE AND BINARY IMAGE]

CORE VICINITY SKELETON IMAGE OF LATENT FINGERPRINT

FINGERPRINT CORE EXTRACTION DEVICE FOR FINGERPRINT MATCHING, FINGERPRINT MATCHING SYSTEM, FINGERPRINT CORE EXTRACTION METHOD, AND PROGRAM THEREFOR

This application is a National Stage Entry of PCT/JP2014/071933 filed on Aug. 21, 2014, which claims priority from Japanese Patent Application 2013-170924 filed on Aug. 21, 2013, the contents of all of which are incorporated herein by reference, in their entirety.

TECHNICAL FIELD

The present invention relates to a fingerprint matching system for executing matching of fingerprint images and, more specifically, to a fingerprint core extraction device for fingerprint matching, a fingerprint matching system, a fingerprint core extraction method, and a program therefore, which are capable of effectively extracting fingerprint core positions of fingerprint images required for matching fingerprint images.

BACKGROUND ART

In general, fingerprints constituted with a great number of ridgelines with streaked pattern have two significant features of being permanent and unique. Therefore, fingerprints are used for criminal investigations from old times.

Particularly, fingerprint matching using a latent fingerprint left in a criminal scene is an effective means for investigation, and many police organizations recently employ a fingerprint matching system using a computer.

For fingerprint matching, as introduced in 3 Minutiae-Based Methods in Handbook of Fingerprint Recognition (Springer 2003) (Non-Patent Document 1), conventionally, feature-point matching using endpoints and bifurcations (combination of the both is called as fingerprint feature point or Minutia), for example, is used broadly.

For example, between high-quality fingerprint images such as inked fingerprints, a sufficient number of minutiae can be extracted from the both fingerprint images. Therefore, high matching accuracy can be guaranteed.

However, in a case where one of those is a latent fingerprint of small region, a minutia extractable range is narrow. Thus, a sufficient number of minutiae cannot be extracted. As a result, it is not possible to perform matching with high accuracy.

Various methods have been proposed for overcoming such issue.

For example, there is a method which not only uses the minutiae but also uses pores, incipient ridges, scars, and the like as new feature amounts.

Further, "Pores and Ridges: Fingerprint Matching Using level 3 Features" (Non-Patent Document 2) proposes use of the pores.

Further, many image matchings using ridgeline shapes are disclosed and, as a related technique thereof, there is known a system (image feature extraction device) which extracts rough feature shapes of fingerprint ridgelines by performing dimensional compression processing (KL Transform) on fingerprint images and extracts a fingerprint image that fits the feature shape from a database as a matching-target image (Patent Document 1).

In fingerprint matching, fingerprint cores (referred to as "cores" hereinafter) are optimum as the information used for specifying matching regions and position alignment. In manual examination executed by an expert examiner, it is widely performed to align the positions according to the cores and compare the ridgeline shapes in the vicinity thereof by visual inspection.

Also proposed is a core extraction method using skeleton images of fingerprint images. In automatic extraction processing, skeleton images in which ridgelines are transformed into skeletons are normally used.

With this method, the skeleton forming an innermost recurve is specified from a skeleton mage, and the vertex is detected and determined as a core, for example.

Note here that the innermost recurve is the skeleton that is located at the innermost side. In a sense, the innermost recurve can also be considered as a loop-like (hoof-like) skeleton.

Criminal identification terms such as the core and the innermost recurve (or innermost loop) and the like are defined in "The Science of Fingerprints-Classification and Uses" (Non-Patent Document 3).

However, core extraction accuracy is an issue when automating the processing.

As disclosed in 3.6 Singularity and Core Detection of Handbook of Fingerprint Recognition (Springer 2003), for example, the mainstream of the core extraction methods proposed heretofore is a method using the ridgeline direction (orientation or vector).

While there is an advantage with this method that it is not susceptible to local noises and the core can be extracted stably, there is such a shortcoming that detailed position detection cannot be expected.

Patent Document 1: Japanese Unexamined Patent Publication Hei 10-177650
Non-Patent Document 1: Handbook of Fingerprint Recognition (Springer 2003)
Non-Patent Document 2: "Pores and Ridges: Fingerprint Matching Using Level3 Features"
Non-Patent Document 3: "The Science of Fingerprints-Classification and Uses"

Feature vectors and the like required for matching cannot be extracted stably from low-quality latent fingerprints with Patent Document 1 described above, so that there is a limit in contributing to improving matching accuracy. Further, there is also such shortcoming that the calculation amount and time for executing matching through pattern matching become tremendous when executing fingerprint matching processing.

Furthermore, there is such shortcoming with the related techniques of Non-Patent Documents 1 and 2 that detailed fingerprint core positions cannot be extracted. Further, with the method using skeleton images for fingerprint matching, cores cannot be detected accurately in a case where a noise is included in the skeleton images or the vicinity of the vertex is a complicated shape.

An object of the present invention is to improve the shortcomings of the related techniques and to provide a fingerprint core extraction device for fingerprint matching capable of extracting fingerprint cores used for matching of fingerprint images with high accuracy, a fingerprint matching system, a fingerprint core extraction method, and a program therefore.

DISCLOSURE OF THE INVENTION

In order to achieve the foregoing object, the fingerprint core extraction device for fingerprint matching according to the present invention is a fingerprint core extraction device for fingerprint matching including a core extraction processing main unit which generates a skeleton image based on a ridgeline shape within a fingerprint image and extracts a fingerprint core for aligning fingerprint positions when performing fingerprint matching of the fingerprint image based on the skeleton image, wherein: the core extraction processing main unit includes a core extraction unit including an endpoint processing function which extracts bifurcations in the skeleton image and executes endpoint processing on each of the bifurcations to generate an endpoint-processed skeleton image (also referred to hereinafter as "endpoint image"), and a skeleton image generation/extraction unit which executes generation processing of the skeleton image by changing a density inverted image formed by white-black inverting density colors of the endpoint image generated thereby into the skeletons; and the core extraction unit includes a core determination function which specifies a loop-like vertex pixel with a highest loop score value that shows a degree of bend in a skeleton shape of the density inverted image and determines it as the fingerprint core.

Further, a fingerprint matching system according to the present invention is a fingerprint matching system including a data processing device which includes an image matching function for performing image matching on one and another fingerprint images inputted from outside based on ridgeline shapes of both of the images, wherein the data processing device includes the fingerprint core extraction device for fingerprint matching as a fingerprint core extraction device which extracts fingerprint cores for fingerprint position alignment executed prior to the image matching.

Further, the fingerprint core extraction method for fingerprint matching according to the present invention is used with a fingerprint core extraction device for fingerprint matching which includes a core extraction processing main unit which generates a skeleton image based on a ridgeline shape within a fingerprint image and extracts a fingerprint core for aligning fingerprint positions when performing fingerprint matching of the fingerprint image based on the skeleton image, wherein: the core extraction processing unit executes each of image processing steps of: extracting bifurcations in the skeleton image and executing endpoint processing on each of the bifurcations to generate an endpoint image; executing generation processing of the skeleton image by changing a density inverted image formed by white-black inverting density colors of the endpoint image generated thereby into skeletons; calculating, by corresponding each skeleton pixel, a loop score that shows a degree of bend in the density inverted image changed into the skeletons; and determining a loop-like shape vertex pixel with a highest value of the loop score as the fingerprint core.

Further, the fingerprint core extraction program for fingerprint matching according to the present invention is used with a fingerprint core extraction device for fingerprint matching which includes a core extraction processing main unit which generates a skeleton image based on a ridgeline shape within a fingerprint image and extracts a fingerprint core for aligning fingerprint positions when performing fingerprint matching of the fingerprint image based on the skeleton image, the program causing a computer provided to the core extraction processing main unit to execute: an endpoint image generation processing function which extracts bifurcations in the skeleton image and executes endpoint processing on each of the bifurcations to generate an endpoint image; a density inverted image skeleton processing function which executes generation processing of the skeleton image by changing a density inverted image formed by white-black inverting density colors of the endpoint image generated thereby into skeletons; a loop score calculation processing function which, by corresponding to each skeleton pixel, calculates a loop score that shows a degree of bend in the density inverted image changed into the skeletons; and a fingerprint core determination processing function which determines a skeleton pixel with a highest value of the loop score as the fingerprint core.

The present invention is structured in the manner described above. Thereby, the module which performs endpoint processing further on a skeleton image generated based on the ridgeline shapes within the fingerprint image and generates a skeleton image by inverting the density of the endpoint image and the module which determines the pixel positions of the fingerprint cores based on the skeleton shape of the generated skeleton images acquired by inverting the density can function effectively. This makes it possible to provide the unprecedented excellent fingerprint core extraction device for fingerprint matching, fingerprint matching system, fingerprint core extraction method, and program therefore capable of specifying fingerprint cores for position alignment at the time of fingerprint matching highly accurately and promptly.

BRIEF DESCRIPTION OF THE DRAWINGS

FIG. 2 is a schematic block diagram showing an example of a second embodiment (a fingerprint matching system including the fingerprint core extraction device for fingerprint matching) of the present invention;

FIG. 3 is a schematic block diagram showing an example of an inside structure of a data processing device that is provided to the fingerprint matching system disclosed in FIG. 2;

FIG. 4 is a flowchart showing entire actions of the fingerprint matching system disclosed in FIG. 2;

FIG. 5 is a flowchart showing a main part of the actions of the fingerprint core extraction device for fingerprint matching that is provided to the fingerprint matching system disclosed in FIG. 2;

FIGS. 6A-6D show examples of two fingerprint images as comparison targets inputted to the fingerprint matching system disclosed in FIG. 2, in which FIG. 6A is an explanatory view showing an example of a fingerprint image 101, FIG. 6B is an explanatory view showing an example of the other fingerprint image 102, FIG. 6C is an explanatory view showing minutiae contained in the fingerprint image 101 of FIG. 6A, and FIG. 6D is an explanatory view showing minutiae contained in the fingerprint image 102 of FIG. 6B;

FIGS. 7A and 7B show skeleton images in which the fingerprint images of FIG. 6 are shown with skeletons, in which FIG. 7A is an explanatory view showing a skeleton image generated based on the fingerprint image of FIG. 6A, and FIG. 7B is an explanatory view showing a skeleton image generated based on the fingerprint image of FIG. 6B;

FIGS. 8A-8D show endpoint processing of bifurcations contained in FIG. 7A, in which FIG. 8A is an explanatory view showing an example of a bifurcation contained in FIG. 7A, FIG. 8B, FIG. 8C are explanatory views showing a method of the endpoint processing of the bifurcation, and FIG. 8D is an explanatory view showing an example of a skeleton image after executing the endpoint processing of the bifurcation;

FIGS. 9A and 9B show examples of skeleton images after the endpoint processing, in which FIG. 9A is an explanatory view showing an example of the skeleton image of FIG. 7A after the endpoint processing and FIG. 9B is an explanatory view showing an example of the skeleton image of FIG. 7B after the endpoint processing;

FIGS. 10A-10D show examples of a case of detecting a core candidate as the vertex of an innermost loop (loop-like skeleton) extracted from the skeleton image after the endpoint processing, in which FIG. 10A is an explanatory view showing an example of the innermost loop extracted from FIG. 9A, FIG. 10B is an explanatory view showing an example of the innermost loop extracted from FIG. 9B, FIG. 10C is an explanatory view showing an example of a core direction determined from the vertex of the innermost loop of FIG. 10A, and FIG. 10D is an explanatory view showing an example of a core direction determined from the vertex of the innermost loop of FIG. 10B;

FIGS. 11A and 11B show examples of skeleton images where the density is inverted, in which FIG. 11A is an explanatory view showing an example of the skeleton image based on the density inverted image of the skeleton image of FIG. 7A, and FIG. 11B is an explanatory view showing an example of the skeleton image based on the density inverted image of the skeleton image of FIG. 7B;

FIGS. 12A and 12B show examples of skeleton images after executing endpoint processing of the bifurcation, in which FIG. 12A is an explanatory view showing an example of the skeleton image after endpoint processing is performed on the skeleton image of FIG. 11A, and FIG. 12B is an explanatory view showing an example of the skeleton image after endpoint processing is performed on the skeleton image of FIG. 11B;

FIGS. 13A and 13B show examples of a case of detecting a core candidate as the vertex of an innermost loop (loop-like skeleton) extracted from the endpoint-processed skeleton image of the density inverted skeleton image, in which FIG. 13A is an explanatory view showing an example of the innermost loop extracted from FIG. 12A and FIG. 13B is an explanatory view showing an example of the innermost loop extracted from FIG. 12B;

FIGS. 14A and 14B show endpoint-processed skeleton images after performing repeated processing of the second-time density inversion, in which FIG. 14A is an explanatory view showing an example of the skeleton image acquired by executing the second-time density inversion on the skeleton image of FIG. 12A, and FIG. 14B is an explanatory view showing an example of the skeleton image acquired by executing the second-time density inversion on the skeleton image of FIG. 12B;

FIGS. 15A and 15B show innermost loops (loop-like skeletons) regarding the endpoint-processed skeleton images after performing repeated processing of the second-time density inversion, in which FIG. 15A is an explanatory view showing an example of the innermost loop extracted from FIG. 14A, and FIG. 15B is an explanatory view showing an example of the innermost loop extracted from FIG. 14B;

FIGS. 16A and 16B show examples of a case where the core positions (positions of the vertex pixels of the loop-like skeletons) and the core directions extracted in FIG. 15 are marked on the input images of FIGS. 6A and 6B, in which FIG. 16A is an explanatory view showing the core position and the core direction in the fingerprint image of FIG. 6A, and FIG. 16B is an explanatory view showing the core position and the core direction in the fingerprint image of FIG. 6B;

FIGS. 17A-17E show explanatory views of skeleton image processing performed on another fingerprint image inputted to the fingerprint matching device disclosed in FIG. 2, in which FIG. 17 is an explanatory view showing an example of that inputted fingerprint image, FIG. 17B is an explanatory view showing a skeleton image generated based on the fingerprint image of FIG. 17A, FIG. 17C is a view showing an example of a case where the skeleton image of FIG. 17B is endpoint processed, FIG. 17D is a view showing density inverted skeleton image (first time) of the skeleton image of FIG. 17C that is endpoint processed, and FIG. 17E is a view showing the skeleton image that is density inversion processed for the second time;

FIGS. 18A and 18B show core vicinity binary images of the fingerprint images specified by using the core positions and the core directions extracted in FIG. 15, in which FIG. 18A is a view showing the core vicinity binary image regarding the fingerprint image of FIG. 6A, and FIG. 18B is a view showing the core vicinity binary image regarding the fingerprint image of FIG. 6B;

FIGS. 20A-20D show an example of a corresponding relation between a latent fingerprint and an inked fingerprint as a pair, in which FIG. 20A is an explanatory view showing an example of the latent fingerprint, FIG. 20B is an explanatory view showing an example of an inked fingerprint image, FIG. 20C is an explanatory view showing an example of an enlarged image of the latent fingerprint in the vicinity of the core, and FIG. 20D is an explanatory view showing an example of an enlarged image of the inked fingerprint in the vicinity of the core;

FIGS. 21A and 21B show an example of a case where skeletons are inputted manually to a latent fingerprint, in which FIG. 21A is an explanatory view showing an example of an enlarged image in the vicinity of the core of the latent fingerprint acquired by inputting the skeletons manually to FIG. 20C, and FIG. 21B is an explanatory view showing an example of a skeleton image extracted from FIG. 21A; and FIGS. 22A and 22B show an example of a corresponding relation between a latent fingerprint and an inked fingerprint as a pair, in which FIG. 22A is an explanatory view showing an example of a core vicinity skeleton image extracted based on FIG. 21A in which the skeleton image and core information are inputted manually, and FIG. 22B is an explanatory view showing an example of a core vicinity binary image of the inked fingerprint generated based on FIG. 20D by corresponding to FIG. 22A.

BEST MODES FOR CARRYING OUT THE INVENTION

First Embodiment

Next, a first embodiment of a fingerprint core extraction device for fingerprint matching according to the present invention will be described by referring to FIG. 1.

In the first embodiment, shown is an example of the fingerprint core extraction device 1 for fingerprint matching, which forms the main part of a fingerprint matching system that will be described in details in a second embodiment.

Through effectively utilizing the fingerprint core extraction device 1, it becomes possible to pick up several tens of candidate inked fingerprints promptly and highly accurately from a plurality (several hundred thousands) of inked fingerprints corresponding to a latent fingerprint, for example.

This will be described in details.

Figure 1:
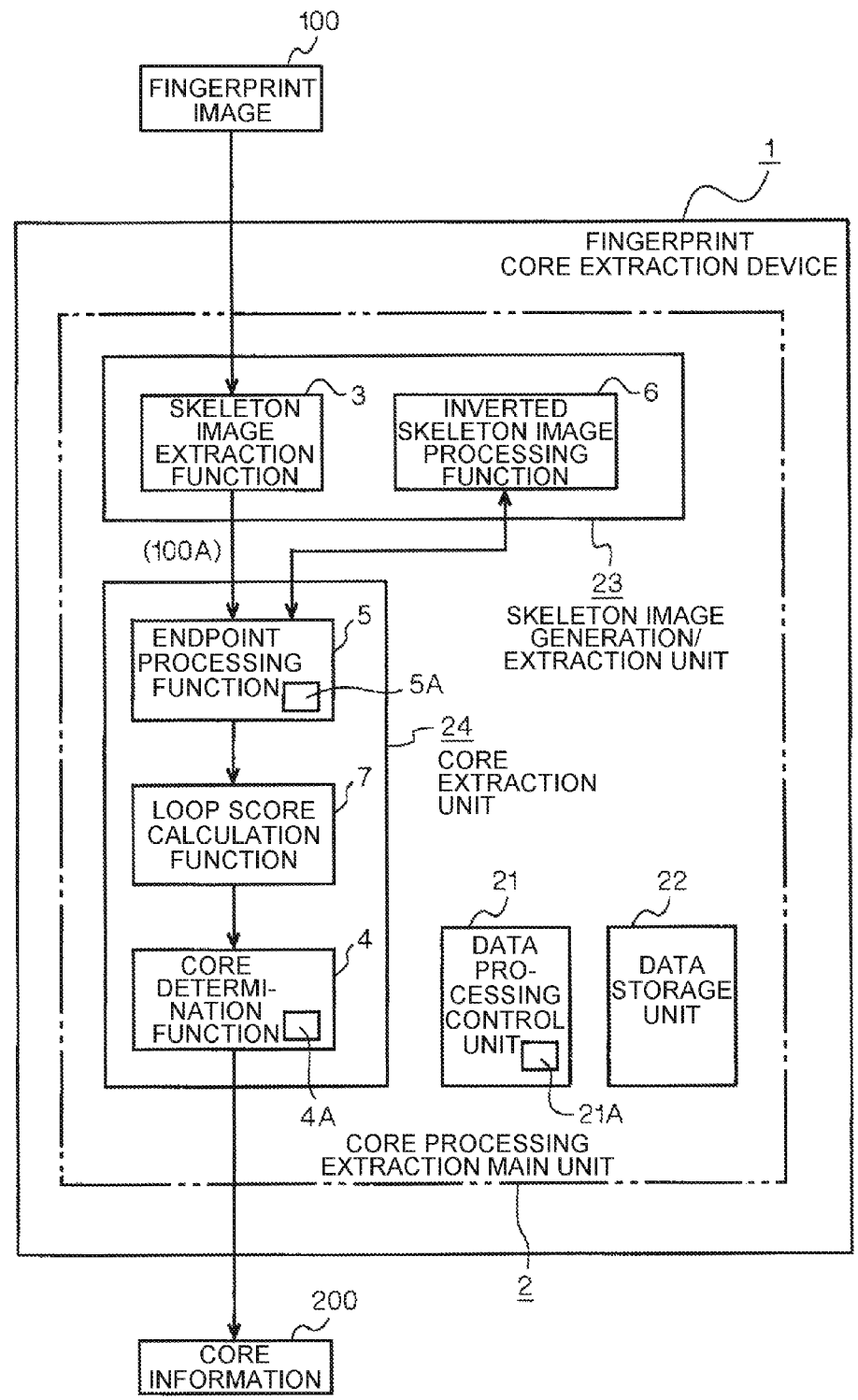
FIG. 1 is a schematic block diagram showing a first embodiment (a fingerprint core extraction device for fingerprint matching) of the present invention.

As shown in FIG. 1, the fingerprint core extraction device 1 for fingerprint matching shown in the first embodiment includes a core extraction processing main unit 2 which generates a skeleton image 100A corresponding to ridgeline shapes by performing skeleton processing on a fingerprint image 100 inputted from outside and extracts a fingerprint core used for fingerprint position alignment when performing fingerprint matching of the fingerprint image 100 based on the skeleton image 100A.

The core extraction processing main unit 23 specifically includes: a skeleton image generation/extraction unit 23 which includes a skeleton image extraction function 3 for generating the skeleton image 100A; and a core extraction unit 24 which includes an endpoint processing function 5 which extracts bifurcations in the skeleton image 100A to be generated and performs endpoint processing on each of the bifurcations to generate an endpoint image.

Note here that the skeleton image generation/extraction unit 23 includes an inverted skeleton image processing function 6 which generates a density inverted image formed by inverting black and white in density colors of the generated endpoint image and performs skeleton processing again to generate a density inverted skeleton image.

Further, the core extraction processing main unit 2 includes: a data processing control unit 21 which controls actions of each of the above-described extraction units 23 and 24; and a data storage unit 22 which is driven by being controlled by the data processing control unit 21 and stores various kinds of data acquired by extraction-processed by each of the above-described units as required.

While the details thereof will be described later, the core extraction unit 24 among those includes a core determination function 4 which specifies a loop-like vertex pixel (skeleton pixel) of a highest loop score value that shows the curving degree of the skeleton shape (innermost loop) of the density inverted skeleton image described above and determines it as the fingerprint core.

Thereby, a module (the skeleton image generation/extraction unit 23) for generating the skeleton image by further performing endpoint processing on the skeleton image generated based on the ridgeline shape within the fingerprint image 100 and by performing density inversion on the endpoint image and a module (the core extraction unit 24) for determining the fingerprint core pixel position based on the skeleton shape of the skeleton image generated by performing density inversion effectively function so that the fingerprint core used for position alignment when performing fingerprint matching can be effectively specified highly accurately and effectively.

That is, as described above, the skeleton image generation/extraction unit 23 includes: the skeleton extraction function 3 which generates the skeleton image 100A based on the ridgeline shapes within the inputted fingerprint image 100; and the inverted skeleton image processing function 6 which generates a density inverted image formed by skeleton processing the density inverted image that is formed by inverting black and white of density colors of the generated endpoint image.

The above-described core extraction unit 24 further includes a loop score calculation function 7 which calculates in advance loop scores showing the degree of the recurve (loop state) in the skeleton shape of the endpoint image generated by the endpoint processing function 5 by corresponding to each of the skeleton pixels. The loop score is in the loop-like skeleton shape, and it is defined that the value thereof becomes greater as the width of the skeleton shape is narrower.

Then, the core determination function 4 of the above-described core extraction unit 24 detects the vertex of the bend degree (loop state) of in the skeleton shape and determines it as the fingerprint core as described above. In this case, the core determination function 4 in the first embodiment specifies the vertex of the loop-like skeleton (innermost loop) located at the innermost side as the fingerprint core.

Further, the core determination function 4 of the core extraction unit 24 includes a core direction determination function 4A which acquires trace final point pixels through tracing a specific distance from the fingerprint core to one and the other directions on the skeleton and determines the direction from the determined fingerprint core (pixel position) towards the midpoint of a segment showing the distance of the width direction between the trace final points as the core direction.

Therefore, with the first embodiment, the positions of each of the fingerprint cores and the core directions (inclinations of each fingerprint) required for fingerprint matching are specified. Thereby, it becomes possible to extract the fingerprints that can be the targets of the fingerprint matching promptly and highly accurately.

Further, the above-described data processing control unit 21 includes a data processing repetition control function 21A which performs control for extracting the skeleton of a higher loop score than a specific value (skeleton with narrow loop width) by controlling the actions of the core extraction unit 24 and the skeleton image generation/extraction unit 23 to execute the endpoint processing and the extraction processing of the skeleton image repeatedly for a specific number of times or more.

Thereby, the skeleton of the loop score about the same level of that of the other skeleton image to be compared can be extracted, so that it is possible to execute extraction work from a great number of other inked fingerprint images highly accurately when searching the latent fingerprint image.

Further, the endpoint processing function 5 of the above-described core extraction unit 24 includes a separated skeleton selecting function 5A which determines in advance the skeleton to be separated from the bifurcation within the skeleton image based on the connection angles of the skeletons at the bifurcation.

This makes it possible to extract the loop-like skeleton with a high loop score more promptly and highly accurately.

That is, as described above, the core extraction unit 24 of the core extraction processing main unit 2 includes the loop score calculation function 7 which calculates the loop scores showing the degree of the recurve in the skeleton shape of the endpoint image by corresponding to each of the skeleton pixels (the inverted skeleton image). Further, the core determination function 4 includes the function which determines the skeleton pixel of the vertex of the loop-like skeleton with the highest loop score value as the fingerprint core.

Note that the core determination function 4 of the core extraction unit 24 is structured to output core information regarding the determined fingerprint core towards a fingerprint matching module set in advance (e.g., a core vicinity binary image matching unit 26 of the data processing device 12 shown in FIG. 3).

Actions of First Embodiment

Next, actions of the first embodiment will be described.

First, in the above-described fingerprint core extraction device 1, the skeleton image extraction function 3 of the skeleton image generation/extraction unit 23 generates a skeleton image based on the ridgeline shape within the fingerprint image 100 inputted from outside (a skeleton image generating step).

Next, the endpoint processing function 5 of the core extraction unit 24 extracts the bifurcations in the skeleton image based on the generated skeleton image and, at the same time, generates an endpoint image by performing the endpoint processing on each of the bifurcations (an endpoint processing step).

Next, the inverted skeleton image processing function 6 of the skeleton image generation/extraction unit 23 forms a density inverted image by inverting white and black of the density colors of the generated endpoint image and, subsequently, performs generation processing of the skeleton image by skeleton processing the density inverted image formed by performing inversion of white and black (an inverted skeleton processing step).

Next, the loop score calculation function 7 calculates the loop scores showing the degree of recurve in the skeleton shape of the endpoint image by corresponding to each of the skeleton pixels (a loop score calculating step).

Then, the skeleton pixel with the highest loop score value is determined as the fingerprint core and outputted outside as core information 200 (a fingerprint core determination processing step).

Regarding each of the steps of the image processing and the fingerprint core determination processing, the skeleton image generation/extraction unit 23 and the core extraction unit 24 constituting the above-described core extraction processing main unit 2 execute the procedures in order.

At the same time, the core determination unction 4 of the core extraction unit 24 in the fingerprint core determination processing step includes and executes a function which specifies the trace final point pixels through tracing a specific distance from the fingerprint core to one and the other directions on the skeleton from the pixel position of the fingerprint core and determines the direction from the specified fingerprint core to the midpoint of the segment showing the distance in the width direction between the trace final points as the core direction. Thereby, the fingerprint core and the core direction regarding the fingerprint image 100 described above are outputted outside from the core extraction unit 24 as the core information 200.

Further, in the first embodiment, the skeleton image generation/extraction unit 23 and the core extraction unit 24 are structured to work in a cooperative manner to repeatedly execute each of the steps of the endpoint processing and the extraction processing of the skeleton image for a specific number of times (e.g., about five times) or more and to extract the skeleton with the loop score that is higher than a specific value thereby. It is designed to execute the content of the steps by the data processing control unit 21 of the core extraction processing main unit 2.

Note here that execution content of each of the steps regarding the endpoint processing, the inverted skeleton processing, the loop score calculation, and core determination may be put into a program to be executed by a computer. In that case, the program is read out from a recording medium by the computer and executed.

In such case, the program may be recorded on a non-transitory recording medium such as a DVD, a CD, a flash memory, or the like. In that case, the program is read out from the recording medium and executed by the computer.

As described above, in the first embodiment, the innermost loop is not only extracted directly from the skeleton image extracted from the ridgeline shape of the fingerprint image as an inputted image but also extracted based on each of the skeleton images (the inverted skeleton images) generated virtually by performing density inversion of the skeleton images.

Thereby, even in cases where a noise is contained in the skeleton image or the skeleton shape in the vicinity of the core is complicated, the innermost loop within the fingerprint image can be extracted highly accurately and stably. Therefore, it is possible to specify the fingerprint core within the fingerprint image highly accurately.

Second Embodiment

Next, the second embodiment will be described by referring to FIG. 2 to FIG. 18.

In the second embodiment, described is the fingerprint matching system 10 to which the fingerprint core extraction device 1 for fingerprint matching disclosed in the first embodiment is mounted as the main part.

First, in FIG. 2, the fingerprint matching system 10 according to the second embodiment includes: a fingerprint data input device 11 which inputs different fingerprint images 101 and 102 as input images; a data processing device 12 which has a function for extracting fingerprint core information required for matching from the two fingerprint images inputted from the fingerprint data input device 11 and performing fingerprint matching by using it; a matching result output device 13 which transmits a matching score 300 as the result of the matching processing done by the data processing device 12 to an external system (an output display device, an external data storage device, or the like).

Note here that the fingerprint matching system 10 is a computer, for example, and a CPU (Central Processing Unit) provided to the fingerprint matching system 10 executes a computer program set in advance to control the actions of each of the function modules that constitute the data processing device 12.

The fingerprint data input device 11 inputs image data acquired by digitizing a fingerprint image read by a sensor or a scanner, for example, to the data processing device 12. Further, the fingerprint data input device 11 may be set to input already-digitized image data to the data processing device 12 as a file data.

Thereby, the fingerprint matching system 10 according to the second embodiment mutually matches two inputted fingerprint images (the fingerprint images 101 and 102), and outputs the matching score data 300 as the matching result thereof.

As in the case of the first embodiment described above, the data processing device 12 includes: a data processing control unit 21 which performs control of exchanging data and messages among each of other structural units constituting the data processing device 12; and a data storage unit 22 as a work area of the data processing executed by each of the structural units (see FIG. 3).

Further, the data processing device 12 includes: the skeleton image generation/extraction unit 23 which generates a skeleton image based on the ridgeline shape within the fingerprint image; and the core extraction unit 24 which extracts the fingerprint cores used for position alignment at the time of fingerprint matching from the fingerprint images.

Furthermore, the core extraction processing main unit 2 similar to the core extraction processing main unit of the first exemplary embodiment described above is constituted with the data processing control unit 21, the data storage module (storage device) 22, the skeleton image generation/extraction unit 23, and the core extraction unit 24. Further, the fingerprint core extraction device 1 having the core extraction processing main unit 2 as the main part thereof is mounted into the data processing device 12.

Further, the data processing device 12 includes: a core vicinity binary image extraction unit 25 which specifies regions to be the matching targets in the fingerprint images by using the fingerprint cores (the core positions and core directions) determined by the core extraction unit 24; and a core vicinity binary image matching unit 26 which calculates matching scores by performing matching processing on the different core vicinity binary images showing the specified matching target regions.

Further, the data storage unit 22 in the second embodiment is constituted with RAM (Random Access Memory) and used as work regions of each of the structural units of the skeleton image generation/extraction unit 23, the core extraction unit 24, the core vicinity binary image extraction unit 25, and the core vicinity binary image matching unit 26. It is also used for temporarily storing information calculated by each of the structural units.

Figure 6A:
Figure 6B:

Note here that examples of fingerprint images inputted to the data processing device 12 are shown in FIGS. 6A and 6B.

The fingerprint image 101 of FIG. 6A is a fingerprint image in which only a small area in the vicinity of the core is impressed, and the fingerprint image 102 of FIG. 6B is a fingerprint image of a normal size to be a pair thereof when making comparison.

Figure 6C:
Figure 6D:

Further, FIG. 6C and FIG. 6D show fingerprint images where small circles are marked at minutia positions of FIG. 6A and FIG. 6B, respectively.

In FIGS. 6A-6D, the fingerprint image 101 is treated as a pseudo latent fingerprint, and the fingerprint image 102 is treated as an inked fingerprint.

In general, the latent fingerprint is a fingerprint left in a criminal scene. The area of the ridgeline region thereof is narrow and the quality is low, so that it is often difficult to perform automatic matching. In the meantime, the inked fingerprint is a fingerprint gathered for records, so that the area of the ridgeline region is wide and the quality is high.

In FIG. 6C, there are only three minutiae, so that success in matching with minutia matching is hardly expected.
(Regarding Fingerprint Matching)

Now, two fingerprints to be the targets of fingerprint matching will be described.

The fingerprints as the targets of fingerprint matching may both be inked fingerprints or may both be latent fingerprints. However, in criminal investigations, matching may be done between a latent fingerprint and inked fingerprints in many cases.

As described above, the fingerprint image 101 that is one of the two fingerprints as the targets of fingerprint matching is defined as a latent fingerprint, and the other fingerprint image 102 is defined as an inked fingerprint image for convenience.

Examples of the fingerprint images shown in the second embodiment are images acquired by digitizing fingerprint images read by a sensor or a scanner.

Such examples of the fingerprint images are digitized with resolution of 500 dpi according to "ANSI/NIST-ITL-1-2000 Data Format for the Interchange of Fingerprint, Facial, & Scar Mark & Tattoo (SMT) Information" standardized by "National Institute of Standards and Technology" of the U.S.

The standardized document can be downloaded from following URL (as of July 2013). ftp://sequoyah.nist.gov/pub/nist internal reports/sp500-245-a16.pdf As described above, the skeleton image generation/extraction unit 23 generates skeleton images from inputted fingerprint data (the fingerprint images 101, 102) and images on which white-black density inversion processing is performed (see FIG. 1).

It is to be noted that the skeleton image generation processing by the skeleton image generation/extraction unit 23 uses a method disclosed in "3Fingerprint Analysis and Representation" in "Handbook of Fingerprint Recognition (Springer 2003)" that is a known technique.

The above-described skeleton image generation/extraction unit 23 extracts the ridgeline directions and enhances (the density of) the ridgelines along the ridgeline directions. Then, it extracts binary images and performs skeleton processing on the binary images to generate skeleton image data (extract skeleton data).

Figure 7A:
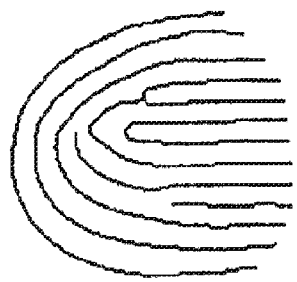
Figure 7B:
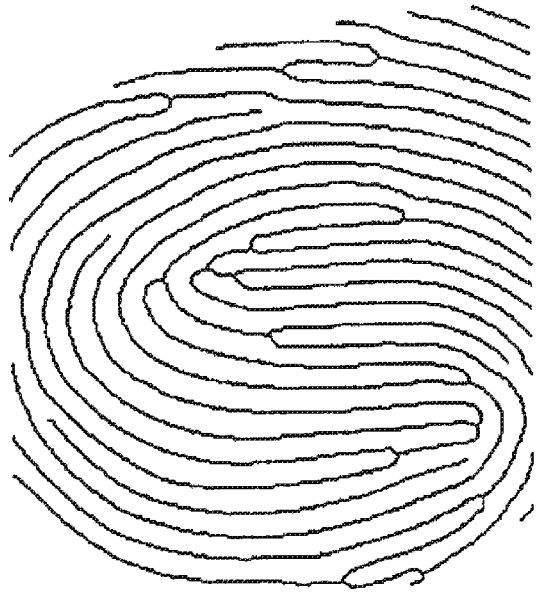

Now, examples of the extracted skeleton images are shown in FIG. 7A and FIG. 7B. The skeleton mage of FIG. 7A is generated based on the ridgeline shape of the fingerprint image 101. The skeleton mage of FIG. 7B is generated based on the ridgeline shape of the fingerprint image 102.

Further, the core extraction unit 24 performs extraction processing of the fingerprint cores from the skeleton images generated by the skeleton image generation/extraction unit 23. The core extraction processing includes determination of the core positions and determination of the core directions. The processing content done by the core extraction unit 24 on the skeleton images is the key processing of the present invention.

Further, when the skeleton image as the core extraction target is stored in the data storage unit 22, the core extraction unit 24 detects bifurcations contained in the skeleton image and then performs endpoint processing on the bifurcations (execution of the endpoint processing function).

In the endpoint processing, one skeleton is selected among the three skeletons constituting the bifurcation and erases the skeleton pixels including the pixels of the part connected to the bifurcations (or performs white inversion). Thereby, the selected skeleton is separated from the bifurcation. Note here that the range of the erased pixels is about four pixels (a half of the average ridgeline space).

A series of data processing one each of the skeleton images of the fingerprint images 101 and 102 is executed smoothly by the fingerprint core extraction device 1 for fingerprint matching according to the first embodiment described above.

Thereby, the bifurcation is transformed into the endpoint as a result, and the remaining two skeletons that are not transformed into endpoints form a smoothly connected single skeleton. Further, the part where the pixels of the separated skeleton are erased turns out as an endpoint (an endpoint as a fingerprint minutia).

That is, the core extraction unit 24 (see FIG. 1 a FIG. 3) determines the skeleton to be separated from the bifurcation based on the connection angles of the three skeletons with respect to the bifurcation. Now, the endpoint processing of the bifurcation (a separated skeleton selection function) will be described in details by referring to FIGS. 8A to 8D.
(Endpoint Processing of Bifurcation)

Figure 8A:
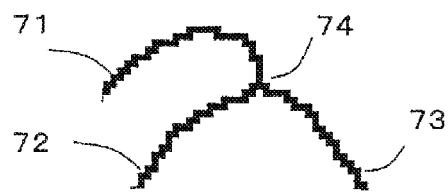

The example of bifurcation skeleton image in FIG. 8A is formed with skeletons 71, 72, 73 and a bifurcation 74 as an intersection point thereof. That is, the pixel to which the three skeletons (71, 72, 73) are connected is the bifurcation 74.

The core extraction unit 24 sets final points on each of the skeletons (71, 72, and 73 herein) by tracing a specific pixel distance set in advance along the three skeletons from the bifurcation 74, respectively, and compares the interior angles formed between the final points and the bifurcation to determine the skeleton (i.e., the separated skeleton) to be separated from the bifurcation 74 among the three skeletons 71, 72, and 73.

At this time, the core extraction unit 24 determines the separated skeleton by using the two kinds of trace distances set in advance (the separated skeleton determination function). Note here that two kinds of the trace distances (pixel distances) are a long distance that is about twice (twenty pixels) the ridgeline space and a short distance that is about a half (five pixels) of the ridgeline space.

Figure 8B:
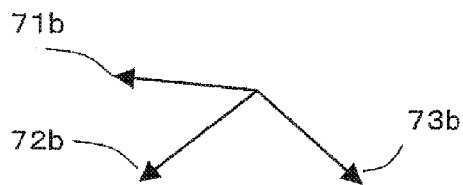

First, the core extraction unit 24 determines the final point on the skeleton according to the first long trace distance (twenty pixels) and, as shown in FIG. 8B, sets a segment connecting between the final point and the bifurcation. Thereby, three segments are set from the bifurcation towards three directions.

Next, regarding the three interior angles formed with the three segments set herein, the smallest interior angle among those is determined. The core extraction unit 24 determines one of the skeletons forming that interior angle as a separation candidate.

Specifically, the interior angle formed between a segment 71b and a segment 72b in FIG. 8B is the smallest, so that the core extraction unit 24 registers the two skeletons (71b and 72b) as the separation candidates.

Figure 8C:

Then, the core extraction unit 24 determines the final points on each of the skeletons according to the second short trace distance (five pixels), and sets segments connecting between the final points and the bifurcation (FIG. 8C).

Here, the core extraction unit 24 determines the largest interior angle among the three interior angles formed by the three set segments.

At this time, the core extraction unit 24 determines a remaining segment other than the segments that form the determined largest interior angle, i.e., determines the skeleton corresponding to the single segment other than the segments that form the largest interior angle. When this skeleton is the separation candidates determined according to the first long trace distance, the core extraction unit 24 determines this skeleton as the separated skeleton.

In the example shown in FIG. 8C, the interior angle formed between the segment 72c and the segment 73c is the largest. Therefore, the segment 71 other than those is the target of separation. The skeleton 71 is one of the separation candidates determined in advance, so that the skeleton 71 is determined as the separated skeleton.

If the skeleton to be the target of separation is not the separation candidate, the second largest interior angle among the interior angles determined according to the short trace distance is determined, and the skeleton corresponding to the segment other than the segments that form the interior angle is determined as the separated skeleton.

Figure 8D:
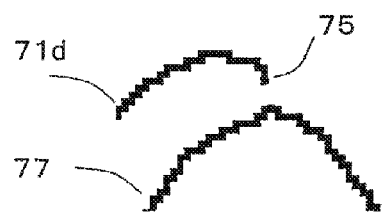

Now, FIG. 8D shows an image from which four pixels that were the connected and erased pixels to the bifurcation in the determined separated skeleton 71, i.e., the skeleton image on which the endpoint processing of the bifurcation is performed.

FIG. 8D shows that the bifurcation 74 of the segment 71 in FIG. 8A is changed into an endpoint 75 of the segment 71d.

Further, the skeletons 72 and 73 are connected and turned into a skeleton 77.

Figure 9B:
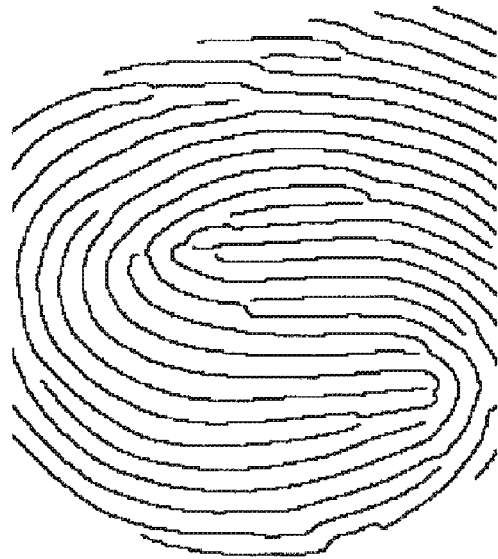
Figure 9A:
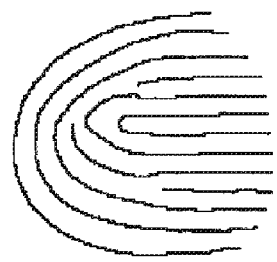

Now, the skeleton images on which the endpoint processing of the bifurcations is performed (endpoint-processed skeleton images) of the fingerprint images 101 and 102 are shown in FIG. 9A and FIG. 9B, respectively.

FIG. 9A and FIG. 9B show the skeleton images containing the sections where the bifurcations are changed into the endpoints (endpoint-processed skeleton images) compared to corresponding FIG. 7A and FIG. 7B.

The core extraction unit 24 calculates the loop score that is quantification of the degree of recurve of the loop-like skeleton by corresponding to each of the skeleton pixels of the skeleton image (endpoint-processed skeleton image) on which the endpoint processing is performed. This calculation is executed by the loop score calculation function 7 of the core extraction unit 24 as described above.

Further, the core extraction unit 24 detects the vertex of the loop-like skeleton based on the calculated loop score (a loop-like skeleton vertex detection function). The vertex of the loop-like skeleton is the fingerprint core as described above.

The above-described loop score is for showing the feature of the fingerprint core (referred to as "core" hereinafter) with a score (numerical value), and it is calculated by corresponding to each skeleton pixel. Further, the core in the second embodiment is defined as the vertex of the loop-like skeleton (referred to as the innermost loop) existing on the innermost side within a fingerprint image.

(Loop-Like Skeleton Vertex Detection Function).

Now, the loop-like skeleton vertex detection function will be described in details by referring to FIGS. 10A to 10D.

Figure 10A:
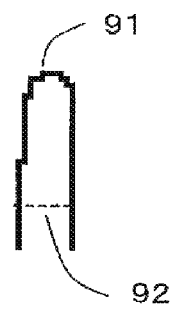

Regarding the skeleton as an innermost loop candidate of the fingerprint image 101 shown in FIG. 10A, the core extraction unit 24 traces a specific distance defined in advance (e.g., about twenty pixels) along the skeleton from the pixel on the skeleton (each skeleton pixel) as the start point in both directions, and acquires the distance (width) between the two pixels (trace final point pixels) as the final points of the trace.

At this time, the core extraction unit 24 calculates and stores the reciprocal of the distance as the loop score corresponding to the skeleton pixel used as the start point.

Specifically, in FIG. 10A, for example, the innermost skeleton is extracted from the fingerprint image 101 as the skeleton with the highest loop score (an innermost loop candidate).

There is shown a segment (dotted line: segment between the trace final points) 92 that is acquired by finding the final points by tracing the skeleton from a point 91 that is the vertex of the loop of the skeleton in both directions along the skeleton for a specific distance and connecting between the final points.

In the skeleton pixel of FIG. 10A, the length (i.e., the distance between the final points) of the segment between the trace final points corresponding to the point 91 is the shortest. Therefore, as the reciprocal of the distance, the loop score becomes the largest.

Further, it is evident from its shape that the loop-like skeleton of FIG. 10A has the loop vertex with the highest loop score in the entire skeleton image of FIG. 9A (i.e., the curvature is highest). Therefore, the point 91 of FIG. 10A is determined as the vertex of the innermost loop of the skeleton image of FIG. 9A, i.e., determined as the core candidate. This is determined by the core determination function 4 of the core extraction unit 24.

Further, after determining the core candidate, the core extraction unit 24 finds the core direction in the core candidate (pixel) (the core direction determination function 4A). This determination is also done by the core determination function 4 of the core extraction unit 24.

At this time, the core extraction unit 24 determines the direction from the determined core candidate towards the midpoint of the segment 92 connecting between the corresponding trace final points (arrow 95 in FIG. 10C) as the core direction of the core candidate point.

Figure 10B:
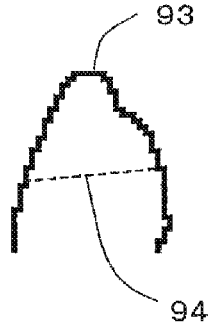
Figure 10C:
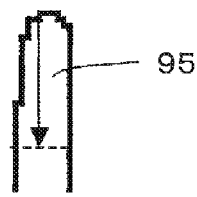

Similarly, the innermost loop candidate shown in FIG. 10B with the highest curvature of the skeleton is extracted from the skeleton image of FIG. 9B.

The core extraction unit 24 traces a specific distance on the skeleton from the skeleton pixel (point 93) of the loop vertex of the innermost loop in both directions and finds a line (a segment between the trace final points) connecting between the final points.

Herein, a segment 94 between the final points corresponding to the point 93 is the shortest, so that the loop score of the point 93 becomes the highest.

Therefore, the skeleton point 93 is determined as the vertex of the innermost loop in the entire skeleton image of FIG. 9B, i.e., determined as the core candidate.

Figure 10D:
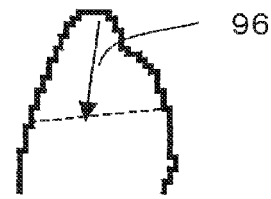

Further, a direction 96 from the core candidate 93 towards the midpoint of the segment 94 is determined as the core direction of the core candidate as shown in FIG. 10D.

Further, as described above, the inverted skeleton image processing function 6 of the skeleton image generation/extraction unit 23 performs density inversion processing of the endpoint-processed latest skeleton image (latest endpoint image) (the density inversion processing function).

Note here that density inversion means the processing which changes the black pixels as the skeleton pixels to the white pixels as the background pixels and changes the white pixels as the background pixels to the black pixels as the skeleton pixels (a white-black inverted image generation function), and the density inverted image is generated by this processing.

Such image processing is also executed in the fingerprint core extraction device 1 for fingerprint matching of FIG. 1 as described above.

Further, the core extraction unit 24 performs the skeleton processing on the generated density inversion image as in the case of FIG. 1 to generate the density inverted skeleton image (execution of skeleton processing on the density inverted image).

Further, the core extraction unit 24 detects the bifurcations from the generated density inverted skeleton images (FIG. 11A, FIG. 11B), and performs endpoint processing on each of the detected bifurcations (endpoint processing of the bifurcations).

Figure 11B:
Figure 11A:
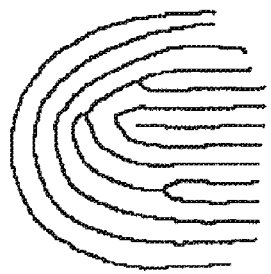

Thereby, new endpoint-processed skeleton images are generated from FIG. 11A and FIG. 11B, respectively. Now, the endpoint-processed skeleton images generated by performing the endpoint processing on the density inverted skeleton images are shown in FIG. 12A and FIG. 12B.

Figure 12B:
Figure 12A:
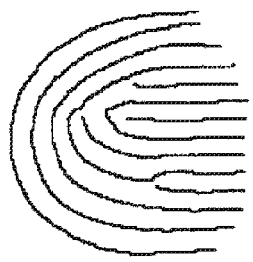

That is, in FIG. 12A and FIG. 12B, the bifurcations contained in FIG. 11A and FIG. 11B are changed into endpoints.

Figure 13B:
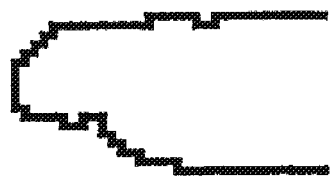
Figure 13A:
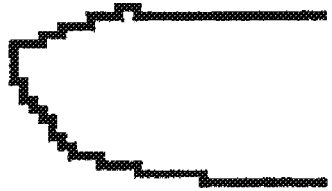

Further, the core extraction unit 24 starts the loop score calculation function 7 to calculate the loop scores of each of the skeleton pixels from the endpoint-processed skeleton images and extract the innermost loops based on the loop scores. The innermost loops $101_2$ and $102_2$ detected herein are shown in FIG. 13A and FIG. 13B, respectively.

The core extraction unit 24 includes a function which then compares the calculated latest loop score with the largest loop score processed theretofore and, when the latest loop score is larger, updates the largest loop score along with the core candidate point and the core direction of the core candidate point.

(Regarding Core Vicinity Binary Image Extraction Unit 25)

Next, the core vicinity binary image extraction unit 25 of the data processing device 12 disclosed in FIG. 3 will be described.

The core vicinity binary image extraction device 25 generates a binary image (a core vicinity binary image) that is acquired by showing a fingerprint image with two kinds of values in white (valley line) and black (ridgeline).

Note here that the fingerprint image binary processing employed by the core vicinity binary image extraction unit 25 is a known technique that is employed broadly, and an example thereof is disclosed in "Fingerprint Analysis and Representation" in "Handbook of Fingerprint Recognition (Springer 2003)" as in the case of the skeleton image generation processing of the skeleton image generation/extraction unit 23 described above.

Further, the core vicinity image extraction unit 25 specifically uses core information (core positions and core directions) determined in advance by corresponding to the two fingerprint images 101 and 102, respectively, and extracts binary images (core vicinity binary images) limited to the vicinity of the cores of each of the two fingerprint images.

Figure 18B:
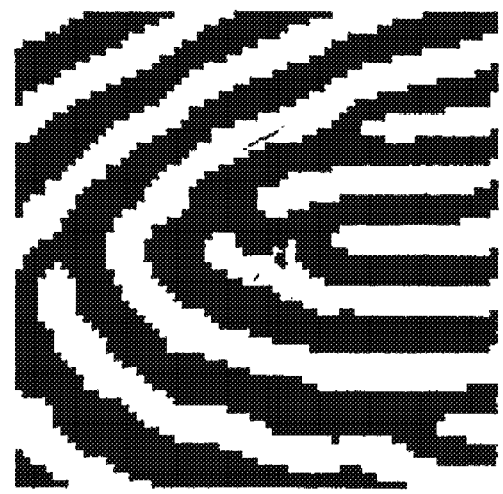
Figure 18A:
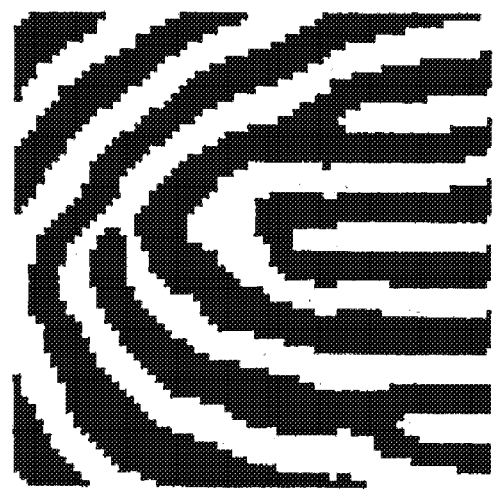

Now, the core vicinity binary images generated by the core vicinity binary image extraction unit 25 are shown in FIG. 18A and FIG. 18B.

For the size of the core vicinity region, it is set as about sixty-four pixel square with respect to the core, for example.

This is because binary image matching becomes difficult due to influences of elastic distortion of the fingerprint if the size of the core vicinity region is too large and long matching time is required. In the meantime, if the region is too narrow, it is possible to deteriorate the matching accuracy itself.

The core vicinity binary image matching unit 26 performs matching processing of the two extracted core vicinity binary images. For this matching processing, the second embodiment employs a matching method called pattern matching or template matching.

That is, the core vicinity binary image matching unit 26 superimposes the two core vicinity binary images while translating and rotating them, and scores the ratio between the number of pixels where the black pixels are overlapping and the number of the other pixels.

Further, the core vicinity binary image extraction unit 26 outputs it as the calculated matching result 300 to the matching result output device 13 (see FIG. 2 and FIG. 3). FIG. 3 shows a case where it is outputted via the data storage unit 22.

The method of core vicinity binary image matching processing employed herein is pattern matching employed broadly, which determines the score by a difference between the pixel units when two fingerprint images are superimposed based on the core positions and the core directions. At this time, pattern matching is performed while executing translation of about several pixels by considering a margin of error generated when extracting the cores.

Actions of Second Embodiment

Next, entire action content (concentrating on the data processing device 12) of the fingerprint matching system 10 according to the second embodiment will be described by referring to flowcharts of FIG. 4 and FIG. 5.

First, the fingerprint data input device 11 (see FIG. 2 and FIG. 3) inputs the two fingerprint images 101 and 102 inputted from outside to the data processing device (FIG. 4: step S1). Here, the inputted fingerprint image data is stored in the data storage unit 22.

Note here that the fingerprint images 101 and 102 inputted form the fingerprint data input device 11 may be digitized images of the fingerprint images read by a scanner or the like, for example. Alternatively, it may also be set to acquire already digitized fingerprint files and stores them in the data storage unit 22.

Then, the skeleton image generating/extraction unit 23 generates skeleton images corresponding to the respective fingerprint images 101 and 102 based on the inputted two fingerprint images, respectively. Further, the skeleton image generation/extraction unit 23 stores the generated skeleton images (see FIGS. 7A and 7B) to the data storage unit 22 (FIG. 4: step S2/a skeleton image extraction step).

Then, the core extraction unit 24 extracts the cores in each of the skeleton images registered in the data storage unit 22, and resisters the core information including the core positions and the core directions within the images to the data storage unit 22 (FIG. 4: step S3/a step of extracting core from skeleton image).

(Specific Content of Core Extraction Step)

Now, the action content of the core extraction processing of the core extraction unit 24 in the above-described step S3 of FIG. 4 will be described in details by referring to a flowchart of FIG. 5.

First, in a case where the skeleton image to be the target of core extraction is stored in the data storage unit 22, the core extraction unit 24 detects the bifurcations contained in the skeleton images and then performs processing for changing the bifurcations to endpoints (FIG. 5: step S31/an endpoint processing step of bifurcation). In the endpoint processing step, specifically the endpoint processing function 5 shown in FIG. 1 executes the content thereof.

In the endpoint processing, as described above, one skeleton among the three skeletons constituting the bifurcation is selected, and the skeleton pixels including the pixels of the part connecting to the bifurcation are erased (or white-inverted). Thereby, the selected skeleton is separated from the bifurcation. Note that the range of the pixels to be erased is about four pixels (a half of the average ridgeline space).

That is, as clearly written in the explanation of the structural content described above, the bifurcation is transformed into the endpoint (endpoint-processed), and the remaining two skeletons that are not transformed into endpoints form a smoothly connected single skeleton. Further, the part where the pixels of the separated skeleton are erased turns out as an endpoint (an endpoint as a fingerprint minutia).

Then, the core extraction unit 24 calculates the loop scores corresponding to each of the skeleton pixels of the skeleton images (endpoint-processed images) on which the endpoint processing is performed. Further, the core extraction unit 24 detects the vertex of the loop-like skeleton based on the calculated loop score (FIG. 5: step S32/a loop-like skeleton vertex detection step).

In the vertex detection step, specifically the core extraction unit 24 sequentially starts each of the functions disclosed in FIG. 1 to execute the content of FIGS. 10A to 10D described above so as to determine the core candidate and the core direction regarding the core candidate as disclosed in paragraphs [0070] to [0078] described above.

Then, the core extraction unit 24 performs density inversion processing of the latest skeleton images turned into endpoints (endpoint-processed core images) (FIG. 5: step S33/a density inversion processing step of latest skeleton images).

Subsequently, the core extraction unit 24 generates the density inverted skeleton images by performing skeleton processing on the generated density inverted images (FIG. 5: step S34/a density inverted image skeleton processing step).

The inverted image skeleton processing step is similar to the processing of step S2 of FIG. 4. However, herein, it is performed on the density inverted image as the target. In that step, as in the case of the first embodiment described above, the skeleton image processing is executed by the inverted skeleton image processing function 6.

The skeleton images (density inverted skeleton images) generated by the processing are shown in FIG. 11A and FIG. 11B, respectively.

FIG. 11A and FIG. 11B are images generated by performing white-black inversion and performing skeleton processing on the endpoint-processed skeleton images of FIG. 9A and FIG. 9B, respectively. The number of density inversion herein is defined as "1".

Subsequently, the core extraction unit 24 detects the bifurcations from the generated density inverted skeleton images (FIG. 11A and FIG. 11B) by the same method as that of step S31 in FIG. 5, and performs endpoint processing on each of the detected bifurcations (FIG. 5: step S35/an endpoint processing of bifurcation).

Thereby, new endpoint-processed skeleton images are generated from FIG. 11A and FIG. 11B, respectively. Now, the endpoint-processed skeleton images generated by performing the endpoint processing on the density inverted skeleton images are shown in FIG. 12A and FIG. 12B.

FIG. 12A and FIG. 12B show that the bifurcations contained in FIG. 11A and FIG. 11B are changed into endpoints.

Each of the endpoint-processed skeleton images of FIG. 12A and FIG. 12B is the newly generated endpoint-processed skeleton image that is clearly different from the first endpoint-processed skeleton images generated in step S31 described above.

That is, while the endpoint processing is the same processing as the processing shown in step S31, the both are notably different in respect that the endpoint processing herein is performed targeted on the density inverted skeleton images.

Then, the core extraction unit 24 calculates the loop scores of each of the skeleton images from the endpoint-processed skeleton images generated in step S35 (execution of the loop score calculation function 7 shown in FIG. 1) and, subsequently, detects the vertexes of the loop-like skeletons based on the loop scores (FIG. 5: step S36/loop score calculation and detection of vertexes of loop-like skeletons).

The above-described processing content of step S36 is similar to the processing of step S32 described above. The innermost loops $101_2$ and $102_2$ detected herein are shown in FIG. 13A and FIG. 13B, respectively.

Then, the core extraction unit 24 compares the latest loop score calculated in step S36 of FIG. 5 with the largest loop score processed theretofore (FIG. 5: step S37/a loop score comparison step). When the latest loop score is larger (FIG. 5: step S37/Yes), the largest loop score is updated along with the core candidate point and the core direction of the core candidate point (FIG. 5: step S37B/a loop score update step).

Subsequently, the core extraction unit 24 returns to step S33 of FIG. 5 and repeats the steps from step S33 to S37. Then, if the latest loop score is not larger, the core extraction unit 24 proceeds to step S38 of FIG. 5.

At the same time, the core extraction unit 24 counts the number of times the processing from step S32 to S37 is repeated and judges whether or not the number has reached the defined number (e.g., five times) set in advance (FIG. 5: step S38/a processing time judgment processing step).

Note here that the core extraction unit 24 repeatedly executes the processing again from step S33 to step S37 when the number of times has not reached the defined times.

The processing time judgment processing is performed since the loop score does not necessarily increase monotonously even if the processing from step S33 to S36 of FIG. 5 is repeatedly executed. The repeated execution of the processing from step S33 to S37 is done by the core extraction unit 24 by being energized by the data processing control unit 21. Empirically, about five times is sufficient as the defined number of times.

In a case where the defined number of times set in advance is satisfied, the core extraction unit 24 determines the core candidate that takes the largest loop score as the core (FIG. 5: step S39/a core determination step). Subsequently, the direction corresponding to the determined core is determined by the method described above, and the core extraction processing is ended thereby.

The core and the core direction are determined by the core determination function 4 of the core extraction unit 24 as described above.

Figure 14B:
Figure 14A:
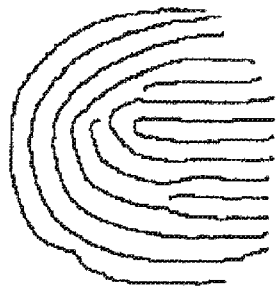

Now, the endpoint-processed skeleton images after executing the second-time repeated processing of density inversion are shown in FIG. 14A and FIG. 14B.

Figure 15B:
Figure 15A:

Further, the innermost loops $101_3$ and $102_3$ extracted from FIG. 14A and FIG. 14B are shown in FIG. 15A and FIG. 15B, respectively.

Note here that the innermost loops of the fingerprint image 101 in FIG. 13A and FIG. 15A are in a same level as that of the innermost loops of FIG. 9A and FIG. 10A, and the loop scores thereof are also equivalent. That is, it is shown to be converged.

Further, it is evident that the innermost loop in FIG. 13A and FIG. 15B takes the largest loop score in the fingerprint image 102. Thus, there is no more increase in the loop score to be expected even if the density inversion processing and the skeleton processing are repeated.

Therefore, the vertexes of the innermost loops are determined in the fingerprint images herein as shown in FIG. 15A and FIG. 15B.

Figure 16B:
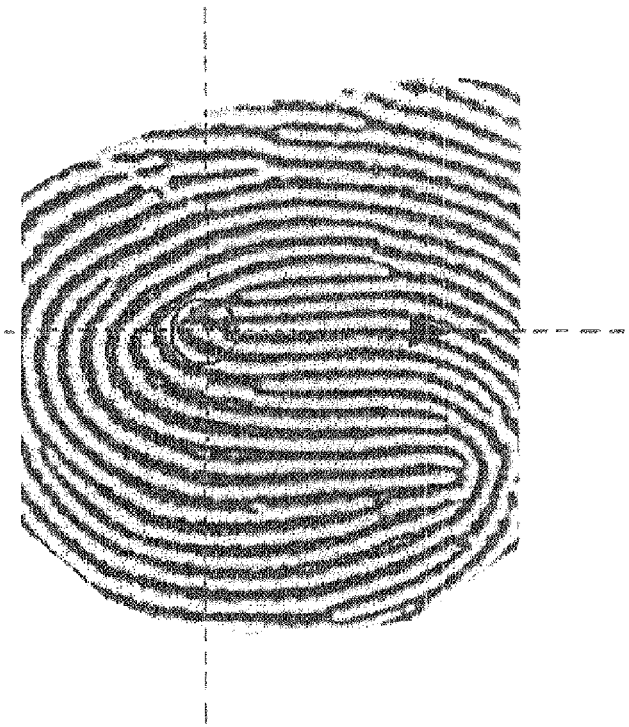
Figure 16A:
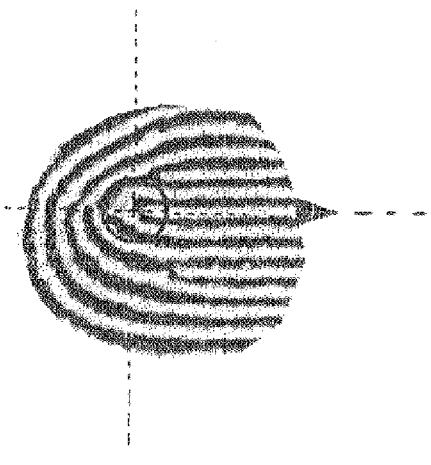

The images in which the extracted core positions and core directions are superimposed on the input images (the fingerprint images 101 and 102) are shown in FIG. 16A and FIG. 16B.

Comparing the vicinity of the core positions in FIG. 16A and FIG. 16B, the difference in the core positions is small (the difference is about five pixels that are about a half of the average ridgeline space) while the ridgeline shapes in the vicinity of the cores are different.

In the example of the fingerprint images, the fingerprint images are adjusted in advance so that the opposite direction of the core direction faces upward (y-axis direction). Thus, the core direction is set to face directly downward.

As described above, the core extraction unit 24 detects the innermost loop not only from the skeleton image directly extracted from the ridgelines of the input image but also based on the skeleton image generated virtually by repeating density inversion.

Thereby, even when the vicinity of the fingerprint core is in a complicated ridgeline shape or when there is a noise contained in the vicinity of the fingerprint core, it is possible to detect the innermost loop in the fingerprint image from the virtual skeleton image. Therefore, the core position (and the core direction) can be extracted highly accurately.

Now, FIGS. 17 to 17E show examples of fingerprint core images when the processing of the embodiment is performed on another fingerprint image (FIG. 17A).

Among those, FIG. 17A is a fingerprint mage as an input image, FIG. 17B is a skeleton image, FIG. 17C is an endpoint-processed skeleton image, FIG. 17D is a skeleton image after the first-time density inversion is executed, and FIG. 17E is a skeleton image after the second-time density inversion is executed.

By repeating the density inversion and the endpoint processing, a virtual and ideal innermost loop can be detected. This makes it possible to extract the fingerprint core position and the core direction highly accurately (end of detailed explanation of step S3).

Then, the core vicinity binary image extraction unit 25 extracts binary images (core vicinity binary images) limited to the vicinity of the respective cores of the two fingerprint images by using the core information (core positions and core directions) determined in step S3 by corresponding to the two fingerprint images, respectively, (FIG. 4: step S4).

In this case, as described above in the structural content, the direction of the image is rotated and adjusted so that the core direction becomes downward (minus direction on the y-axis). Note here that FIG. 18A and FIG. 18B show the core vicinity binary images generated in the processing of step S4 described above.

Then, the core vicinity binary image matching unit 26 performs matching processing of the two core vicinity binary images extracted in step S4 (FIG. 4: step S5/matching of two core vicinity binary images).

For this matching processing, employed is a matching method referred to as pattern matching or template matching.

That is, the core vicinity binary image matching unit 26 superimposes the two core vicinity binary images while translating and rotating them, and scores the ratio between the number of pixels where the black pixels are overlapping and the number of the other pixels. Further, the core vicinity binary image extraction unit 26 outputs it as the calculated matching result to the matching result output device 13 (see FIG. 1) (FIG. 4: step S6/output matching score).

As described above, the second embodiment can achieve the similar working effects as the case of the fingerprint matching core extraction device 1 of the first embodiment described above. Further, through detecting the innermost loop within the skeleton image not only from the skeleton image directly extracted from the ridgelines of the fingerprint image as the input image but also based on the skeleton image (inverted skeleton image) generated virtually by repeating density inversion, the core (core positions and core direction) within the fingerprint image can be specified highly accurately even when there is a noise contained in the skeleton image or when the skeleton shape in the vicinity of the core is complicated.

Further, in the second embodiment, the core position and the core direction can be extracted in a detailed manner. Thus, for performing the fingerprint matching processing, the required translation amount is only about a half (five pixels) of the average ridgeline space and the required rotation amount is about 10°. Therefore, it is possible to perform fingerprint matching processing at a higher speed and highly accurately.

Modification Example of Second Embodiment

In the second embodiment above, described is the case of employing pattern matching of two binary images for matching the core vicinity binary images as shown in step S5 (see FIG. 4). However, it is also possible to employ not a binary image but a skeleton image (referred to as 103) for the first fingerprint image (normally a latent fingerprint) 101 and perform pattern matching of the skeleton image and the binary image.

This will be described in details hereinafter.

First, in this Modification Example, the method for extracting the skeleton image from the fingerprint image is the same as that of step S2 of FIG. 4 described above. Further, the procedures for extracting the skeleton image of valleys (valley lines) from the density inverted image of the skeleton image is also the same as those of step S33 and S34 of FIG. 4 described above.

Note that a normal skeleton is called herein as a black skeleton, and a skeleton on the valley (valley line) side is called as a white skeleton.

Figure 19:
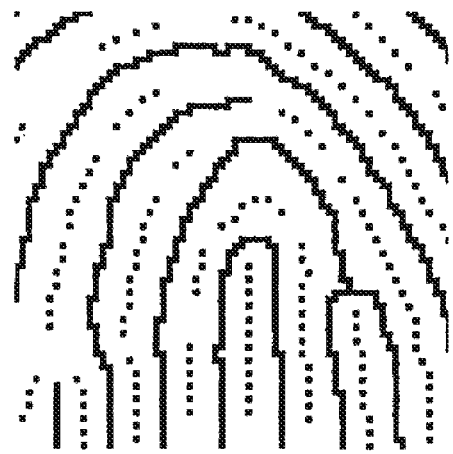
FIG. 19 is an explanatory the core vicinity skeleton image extracted from FIG. 18A, which shows an example where normal skeletons (black skeletons) are shown with solid lines and skeletons (white skeletons) of ridgeline grooves (valley lines) are shown with broken lines.

Now, the core vicinity skeleton image 103 of the extracted fingerprint image 101 is shown in FIG. 19. In FIG. 19, the black skeleton is shown with a solid line and the white skeleton is shown with a broken line for discriminating the black skeleton from the white skeleton. Further, when the white skeleton comes in contact with a binary image of a ridgeline, it is eliminated.

In this Modification Example, matching is to be done from the first fingerprint image 101 side to the second fingerprint image 102. Further, in this Modification Example, score is added if the second fingerprint image corresponding to the pixel position of the black skeleton of the first fingerprint image 101 is a black ridgeline, and score is decreased if it is not a black ridgeline.

Then, score is decreased if the pixel position of the second fingerprint image 102 corresponding to the pixel position of the white skeleton of the core vicinity skeleton image 103 is a black ridgeline, and score is increased if it is not a black ridgeline.

Note that this Modification Example is especially effective in a case where the fingerprint image 101 is a latent fingerprint. Now, a latent fingerprint image (corresponding to the first fingerprint image 101) is shown in FIG. 20A, and an inked fingerprint image (corresponding to the second fingerprint image) as a pair of the latent fingerprint image is shown in FIG. 20B.

Further, FIGS. 20C and 20D show enlarged images of the vicinity of the cores of FIGS. 20A and 20B, respectively.

In this case, the enlarged image of the vicinity of the core in FIG. 20 shows that ridgelines are unclear because of its low quality.

In this case, the extraction accuracy of the core and the core vicinity binary image is also deteriorated. Thus, the matching accuracy in pattern matching is notably deteriorated, so that it is not expected to succeed in fingerprint matching.

However, in such case, a fingerprint examiner in general recognizes the ridgelines of a low-quality latent fingerprint such as those shown in FIGS. 20C and 20D, and performs manual input of the skeletons to add to the core positions and the core directions.

Figure 21B:
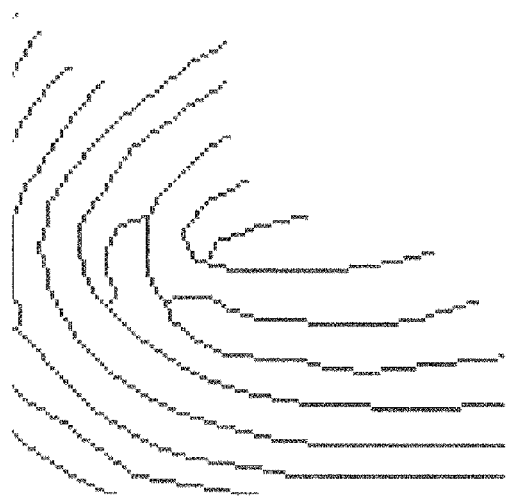
Figure 21A:
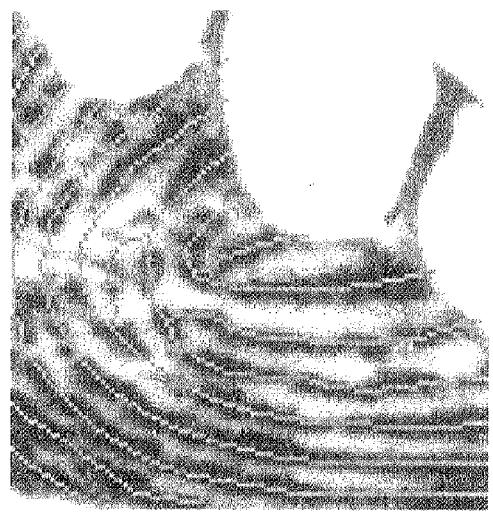

Now, the skeleton image in which the skeletons are inputted manually to be added to the core positions and the core directions by the fingerprint examiner is shown in FIG. 21A.

Further, FIG. 21A shows the skeleton image inputted manually, and FIG. 21B shows the core vicinity skeleton image extracted by using the core positions and the core directions inputted manually. This can be achieved by using the manually-inputted skeleton as the image inputted in step S4 of FIG. 4.

Figure 22B:
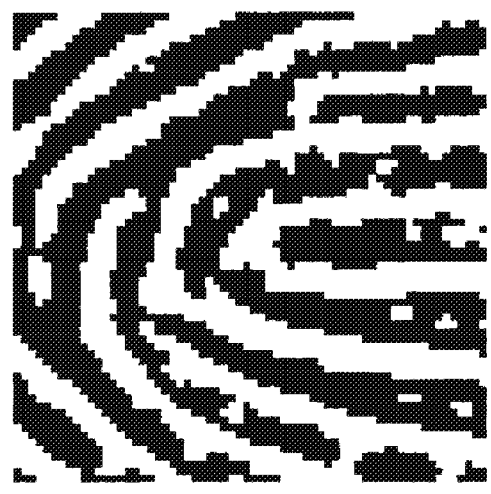
Figure 22A:
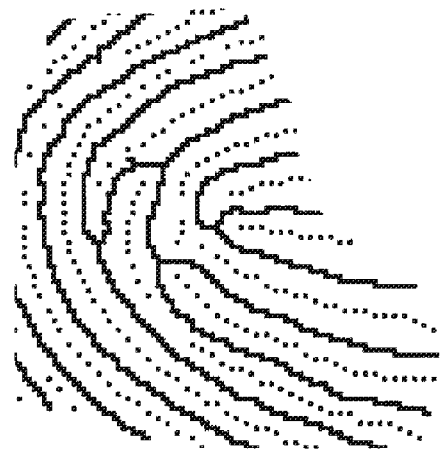

Further, FIG. 22A shows the core vicinity skeleton image of the latent fingerprint acquired by applying the method of FIG. 19 to FIG. 21A. Also, FIG. 22B shows the core vicinity binary image of the inked fingerprint as a pair to be matched.

Out of those, FIG. 22B showing the core vicinity binary image of the inked fingerprint side is extracted by the procedures shown in the second embodiment described above.

That is, with this Modification Example, as shown in FIG. 22A and FIG. 22B, the correspondence between the black skeleton (solid line) and the white skeleton (dotted line) is clarified. Therefore, matching between those can be easily done, so that it is expected to improve the accuracy of fingerprint matching.

As described above, in the second embodiment, the innermost loop is not only extracted directly from the skeleton image extracted from the ridgeline shape of the fingerprint image as an inputted image but also extracted based on each of the skeleton images (the inverted skeleton images) generated virtually by performing density inversion of the skeleton images.

Further, through calculating the loop scores of the skeleton images in each of the images while repeatedly performing density inversion of the skeleton images and endpoint processing as well as the skeleton processing of the density inverted images, it is possible to extract the innermost loops and to determine the cores as the vertexes of the innermost loops highly accurately.

Thereby, even in cases where a noise is contained in the skeleton image or the skeleton shape in the vicinity of the core is complicated, the innermost loop within the fingerprint image can be extracted highly accurately and stably. Therefore, it is possible to specify the fingerprint core within the fingerprint image highly accurately.

Further, the Modification Example of the second embodiment is designed to perform matching of the skeleton image as shown in FIG. 22A and the binary image as shown in FIG. 22B. Thus, matching can be done easily, so that it is expected to improve the accuracy of the fingerprint matching.

While new technical content of each of the above-described embodiments can be summarized as in following Supplementary Notes, it is to be noted that the present invention is not limited only to those.

(Supplementary Note 1)

A fingerprint core extraction device 1 for fingerprint matching, including a core extraction processing main unit 2 which generates a skeleton image based on a ridgeline shape within a fingerprint image and extracts a fingerprint core for aligning fingerprint positions when performing fingerprint matching of the fingerprint image based on the skeleton image, wherein:

the core extraction processing main unit 2 includes a core extraction unit 24 including an endpoint processing function 5 which extracts bifurcations in the skeleton image and executes endpoint processing on each of the bifurcations to generate an endpoint image, and a skeleton image generation/extraction unit 23 which executes generation processing of the skeleton image by changing a density inverted image formed by white-black inverting density colors of the endpoint image generated thereby into the skeletons; and the core extraction unit 24 includes a core determination function 4 which specifies a loop-like vertex pixel with a highest loop score value that shows a degree of bend in a skeleton shape of the density inverted image and determines it as the fingerprint core.

(Supplementary Note 2)

The fingerprint core extraction device for fingerprint matching as depicted in Supplementary Note 1, wherein the skeleton image generation/extraction unit 23 includes
- a skeleton image extraction function 3 which generates the skeleton image based on the ridgeline shape within the fingerprint image to be inputted, and an inverted skeleton image processing function 6 which executes skeleton processing on the density inverted image formed by white-black inverting the density colors of the endpoint image.

(Supplementary Note 3)

The fingerprint core extraction device for fingerprint matching as depicted in Supplementary Note 2, wherein the core extraction unit 24 includes a loop score calculation function 7 which, by corresponding to each skeleton pixel, calculates in advance the loop score showing the degree of bend in the skeleton shape of the endpoint image generated by the endpoint processing function 5.

(Supplementary Note 4)

The fingerprint core extraction device for fingerprint matching as depicted in Supplementary Note 1, wherein
- the core determination function 4 of the core extraction unit includes a core direction determination function 4A which acquires trace final point pixels by tracing a specific distance on the skeleton from the fingerprint core to one and the other directions and determines a direction from the determined fingerprint core to a midpoint of a segment showing distance in a width direction between the trace final points as a core direction.

(Supplementary Note 5)

The fingerprint core extraction device for fingerprint matching as depicted in Supplementary Note 3, wherein
- the core extraction processing main unit 2 includes a data processing control unit 21 which performs control to extract a skeleton with a loop score higher than a specific value by repeatedly executing the endpoint processing and extraction processing of the skeleton image for a specific number of times or more.

(Supplementary Note 6)

The fingerprint core extraction device for fingerprint matching as depicted in Supplementary Note 3, wherein
- the endpoint processing function 5 of the core extraction unit includes a separated skeleton selection function 5A which determines the skeleton to be separated from the bifurcation based on a connection angle of the skeleton with respect to the bifurcation.

(Supplementary Note 7) (as Independent Claim)

A fingerprint matching system including a data processing device which includes an image matching function for performing image matching on one and another fingerprint images inputted from outside based on ridgeline shapes of both of the images, wherein
- the data processing device includes the fingerprint core extraction device for fingerprint matching defined in any one of Supplementary Notes 1 to 6 as a fingerprint core extraction device which extracts fingerprint cores for fingerprint position alignment executed prior to the image matching.

(Supplementary Note 8)

The fingerprint matching system as depicted in Supplementary Note 7, wherein
- the data processing device includes a core vicinity binary image matching unit 26 which generates a core vicinity binary image of a specific region including the fingerprint core determined based on the fingerprint image and executes fingerprint matching by pattern matching based on the core vicinity binary image.

(Supplementary Note 9) (Invention of Process/Corresponding to Supplementary Note 1)

A fingerprint core extraction method used with a fingerprint core extraction device for fingerprint matching which includes a core extraction processing main unit which generates a skeleton image based on a ridgeline shape within a fingerprint image and extracts a fingerprint core for aligning fingerprint positions when performing fingerprint matching of the fingerprint image based on the skeleton image, wherein:
- the core extraction processing unit executes each of image processing steps of:
  - extracting bifurcations in the skeleton image and executing endpoint processing on each of the bifurcations to generate an endpoint image;
  - executing generation processing of the skeleton image by changing a density inverted image formed by white-black inverting density colors of the endpoint image generated thereby into skeletons;
  - calculating, by corresponding each skeleton pixel, a loop score that shows a degree of bend in the density inverted image changed into the skeletons;
  - and determining a loop-like shape vertex pixel with a highest value of the loop score as the fingerprint core.

(Supplementary Note 10) (Corresponding to Supplementary Note 4)

The fingerprint core extraction method for fingerprint matching as depicted in Supplementary Note 9, wherein, when executing the step of determining the fingerprint core,
- simultaneously, trace final point pixels are specified by tracing a specific distance on the skeleton from the fingerprint core to one and the other directions and a direction from the determined fingerprint core to a midpoint of a segment showing distance in a width direction between the trace final points is determined as a core direction.

(Supplementary Note 11) (Corresponding to Supplementary Note 5) The fingerprint core extraction method for fingerprint matching as depicted in Supplementary Note 9, wherein:
- the core extraction processing main unit repeatedly executes each step of the endpoint processing and the skeleton image extraction processing for a specific number of times or more and extracts the skeleton of the loop score higher than a specific value thereby.

(Supplementary Note 12) (Corresponding to Supplementary Note 9)

A fingerprint core extraction program used with a fingerprint core extraction device for fingerprint matching which includes a core extraction processing main unit which generates a skeleton image based on a ridgeline shape within a fingerprint image and extracts a fingerprint core for aligning fingerprint positions when performing fingerprint matching of the fingerprint image based on the skeleton image, the program causing a computer provided to the core extraction processing main unit to execute:
- an endpoint image generation processing function which extracts bifurcations in the skeleton image and executes endpoint processing on each of the bifurcations to generate an endpoint image;

a density inverted image skeleton processing function which executes generation processing of the skeleton image by changing a density inverted image formed by white-black inverting density colors of the endpoint image generated thereby into skeletons;

a loop score calculation processing function which, by corresponding to each skeleton pixel, calculates a loop score that shows a degree of bend in the density inverted image changed into the skeletons; and a fingerprint core determination processing function which determines a loop-like shape vertex pixel with a highest value of the loop score as the fingerprint core.

(Supplementary Note 13) (Corresponding to Supplementary Note 10)

The fingerprint core extraction program as depicted in Supplementary Note 12, wherein the fingerprint core determination processing function includes a core direction determination processing function which specifies trace final point pixels by tracing a specific distance on the skeleton from the fingerprint core to one and the other directions, and determines a direction from the determined fingerprint core to a midpoint of a segment showing distance in a width direction between the trace final points as a core direction simultaneously, which is achieved by the computer provided to the core extraction processing main unit.

(Supplementary Note 14) (Corresponding to Supplementary Note 11)

The fingerprint core extraction program as depicted in Supplementary Note 12, which causes the computer provided to the core extraction processing main unit to execute a high loop score skeleton extraction processing function which repeatedly executes each step of the endpoint processing and the skeleton image extraction processing for a specific number of times or more and extracts the skeleton of the loop score higher than a specific value thereby.

This application claims the Priority right based on Japanese Patent Application No. 2013-170924 filed on Aug. 21, 2013 and the disclosure thereof is hereby incorporated by reference in its entirety.

INDUSTRIAL APPLICABILITY

The present invention includes the content that can be applied to a fingerprint image matching system desired in all police organizations in Japan and abroad, for example, which extracts a plurality of fingerprint images as matching targets promptly and highly accurately from a fingerprint image database in which a vast amount of fingerprint images are stored, and its applicability is highly versatile.

REFERENCE NUMERALS

1 Fingerprint core extraction device
2 Core processing extraction main unit
3 Skeleton image extraction function
4 Core determination function
4A Core direction determination function
5 Endpoint processing function
5A Separated skeleton selection function
6 Inverted skeleton image processing function
7 Loop score calculation function
10 Fingerprint matching system
11 Fingerprint data input device
12 Data processing device
13 Matching result output device
21 Data processing control unit
21A Data processing repetition control function
22 Data storage unit
23 Skeleton image generation/extraction unit
24 Core extraction unit
25 Core vicinity binary image extraction unit
26 Core vicinity binary image matching unit
100, 101, 102 Fingerprint image
200 Core information
300 Matching score

What is claimed is:

1. A fingerprint core extraction device for fingerprint matching, comprising a main core extraction processor which generates a skeleton image based on a ridgeline shape within a fingerprint image and extracts a fingerprint core for aligning fingerprint positions when performing fingerprint matching of the fingerprint image based on the skeleton image, wherein:

the main core extraction processor comprises
a data processing controller; and
a memory storing instructions that when executed by the data processing controller implement;
a core extraction unit including an endpoint processing function which extracts bifurcations in the skeleton image and executes endpoint processing on each of the bifurcations to generate an endpoint image, and a skeleton image generation/extraction unit which executes generation processing of the skeleton image by changing a density inverted image formed by white-black inverting density colors of the endpoint image generated thereby into the skeletons; and the core extraction unit includes a core determination function which specifies a loop-like vertex pixel with a highest loop score value that shows a degree of bend in a skeleton shape of the density inverted image and determines it as the fingerprint core.

2. The fingerprint core extraction device for fingerprint matching as claimed in claim 1, wherein the skeleton image generation/extraction unit includes a skeleton image extraction function which generates the skeleton image based on the ridgeline shape within the fingerprint image to be inputted, and an inverted skeleton image processing function which executes skeleton processing on the density inverted image formed by white-black inverting the density colors of the endpoint image.

3. The fingerprint core extraction device for fingerprint matching as claimed in claim 2, wherein the core extraction unit includes a loop score calculation function which, by corresponding to each skeleton pixel, calculates in advance the loop score showing the degree of bend in the skeleton shape of the endpoint image generated by the endpoint processing function.

4. The fingerprint core extraction device for fingerprint matching as claimed in claim 1, wherein the core determination function of the core extraction unit includes a core direction determination function which acquires trace final point pixels by tracing a specific distance on the skeleton from the fingerprint core to one and the other directions, and determines a direction from the determined fingerprint core to a midpoint of a segment showing distance in a width direction between the trace final points as a core direction.

5. The fingerprint core extraction device for fingerprint matching as claimed in claim 3, wherein the data processing controller performs control to extract a skeleton with a loop score higher than a specific value by repeatedly executing the endpoint processing and extraction processing of the skeleton image for a specific number of times or more.

6. The fingerprint core extraction device for fingerprint matching as claimed in claim 3, wherein
the endpoint processing function of the core extraction unit includes a separated skeleton selection function which determines the skeleton to be separated from the bifurcation based on a connection angle of the skeleton with respect to the bifurcation.

7. A fingerprint matching system comprising a data processing device which includes an image matching function for performing image matching on one and another fingerprint images inputted from outside based on ridgeline shapes of both of the images, wherein
the data processing device comprises the fingerprint core extraction device for fingerprint matching defined in claim 1 as a fingerprint core extraction device which extracts fingerprint cores for fingerprint position alignment executed prior to the image matching.

8. A fingerprint core extraction method for generating a skeleton image based on a ridgeline shape within a fingerprint image and extracting a fingerprint core for aligning fingerprint positions when performing fingerprint matching of the fingerprint image based on the skeleton image, comprising:
extracting bifurcations in the skeleton image and executing endpoint processing on each of the bifurcations to generate an endpoint image;
executing generation processing of the skeleton image by changing a density inverted image formed by white-black inverting density colors of the endpoint image generated thereby into skeletons;
calculating, by corresponding each skeleton pixel, a loop score that shows a degree of bend in the density inverted image changed into the skeletons;
and determining a loop-like shape vertex pixel with a highest value of the loop score as the fingerprint core.

9. The fingerprint core extraction method for fingerprint matching as claimed in claim 8, wherein, when executing the step of determining the fingerprint core,
simultaneously, trace final point pixels are specified by tracing a specific distance on the skeleton from the fingerprint core to one and the other directions, and a direction from the determined fingerprint core to a midpoint of a segment showing distance in a width direction between the trace final points is determined as a core direction.

10. A non-transitory computer readable recording medium storing a fingerprint core extraction program used with a fingerprint core extraction device for fingerprint matching which comprises a core extraction processing main unit which generates a skeleton image based on a ridgeline shape within a fingerprint image and extracts a fingerprint core for aligning fingerprint positions when performing fingerprint matching of the fingerprint image based on the skeleton image, the program causing a computer provided to the core extraction processing main unit to execute:
an endpoint image generation processing function which extracts bifurcations in the skeleton image and executes endpoint processing on each of the bifurcations to generate an endpoint image;
a density inverted image skeleton processing function which executes generation processing of the skeleton image by changing a density inverted image formed by white-black inverting density colors of the endpoint image generated thereby into skeletons;
a loop score calculation processing function which, by corresponding to each skeleton pixel, calculates a loop score that shows a degree of bend in the density inverted image changed into the skeletons; and
a fingerprint core determination processing function which determines a loop-like shape vertex pixel with a highest value of the loop score as the fingerprint core.

* * * * *